US012624500B2

(12) United States Patent
Hu et al.

(10) Patent No.: US 12,624,500 B2
(45) Date of Patent: May 12, 2026

---

(54) EXTRACTION OF DELIGNIFIED, CELLULOSE-BASED FIBERS FROM NATURAL PLANT MATERIAL, AND MATERIALS INCORPORATING SUCH FIBERS

(71) Applicant: UNIVERSITY OF MARYLAND, COLLEGE PARK, College Park, MD (US)

(72) Inventors: Liangbing Hu, Rockville, MD (US); Chaoji Chen, Sykesville, MD (US); Zhihan Li, College Park, MD (US); Jianguo Li, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 713 days.

(21) Appl. No.: 17/919,125

(22) PCT Filed: Apr. 21, 2021

(86) PCT No.: PCT/US2021/028333
§ 371 (c)(1),
(2) Date: Oct. 14, 2022

(87) PCT Pub. No.: WO2021/216663
PCT Pub. Date: Oct. 28, 2021

(65) Prior Publication Data
US 2023/0160141 A1      May 25, 2023

Related U.S. Application Data

(60) Provisional application No. 63/065,994, filed on Aug. 14, 2020, provisional application No. 63/013,401, filed on Apr. 21, 2020.

(51) Int. Cl.
| | |
|---|---|
| *D21C 3/26* | (2006.01) |
| *C04B 18/24* | (2006.01) |
| *C08J 5/24* | (2006.01) |
| *C08L 29/04* | (2006.01) |
| *C08L 97/02* | (2006.01) |
| *D21C 3/00* | (2006.01) |
| *D21C 3/02* | (2006.01) |

(52) U.S. Cl.
CPC .............. *D21C 3/26* (2013.01); *C04B 18/248* (2013.01); *C08J 5/245* (2021.05); *C08J 5/248* (2021.05); *C08L 29/04* (2013.01); *C08L 97/02* (2013.01); *D21C 3/003* (2013.01); *D21C 3/006* (2013.01); *D21C 3/022* (2013.01); *C08J 2363/00* (2013.01); *C08J 2401/02* (2013.01); *C08L 2205/16* (2013.01)

(58) Field of Classification Search
CPC .......... B01D 1/00; C04B 18/248; C08J 5/245; C08J 5/248; C08J 2363/00; C08J 2401/02; C08L 29/04; C08L 97/02; C08L 2205/16; D21C 3/26; D21C 3/003; D21C 3/006; D21C 3/022; D21H 11/12; D21H 15/00
See application file for complete search history.

(56) References Cited

U.S. PATENT DOCUMENTS

| | | |
|---|---|---|
| 11,130,256 B2 | 9/2021 | Hu et al. |
| 11,440,214 B2 | 9/2022 | Hu et al. |
| 11,554,514 B2 | 1/2023 | Hu et al. |
| 11,958,209 B2 | 4/2024 | Hu et al. |
| 12,168,727 B2 | 12/2024 | Hu et al. |
| 2002/0112827 A1 | 8/2002 | Merkley et al. |
| 2004/0145078 A1 | 7/2004 | Merkley et al. |
| 2006/0180285 A1 | 8/2006 | Yang et al. |
| 2008/0145637 A1 | 6/2008 | Frank |
| 2012/0180964 A1 | 7/2012 | Heinricher |
| 2017/0073852 A1 | 3/2017 | Uno et al. |
| 2018/0002514 A1 | 1/2018 | Henry et al. |
| 2018/0370071 A1 | 12/2018 | Boitouzet et al. |
| 2019/0112764 A1 | 4/2019 | Banu et al. |
| 2021/0122902 A1 | 4/2021 | Hu et al. |

(Continued)

FOREIGN PATENT DOCUMENTS

| | | |
|---|---|---|
| CA | 1066697 A | 11/1979 |
| CA | 2608174 A1 | 4/2009 |
| JP | 2008-001064 A | 1/2008 |

(Continued)

OTHER PUBLICATIONS

Geng et al., "Effect of Delignification on Hemicellulose Extraction from Switchgrass, Poplar, and Pine and Its Effect on Enzymatic Convertibility of Cellulose-rich Residues," *BioResources*, May 2018, 13(3): pp. 4946-4963. (19 pages).

(Continued)

*Primary Examiner* — Anthony J Green

(74) *Attorney, Agent, or Firm* — RowanTree Law Group, PLLC; Frederick F. Rosenberger

(57) ABSTRACT

A piece of natural plant material is subjected to one or more chemical treatments to remove substantially all lignin therefrom, thereby allowing the extraction of delignified, cellulose-based fibers. For example, the natural plant material can be a grass, such as bamboo or gladiolus. Subsequent drying of the extracted fiber densifies the structure, yielding improved mechanical properties. In some embodiments, the extracted fibers can be used, either alone or in combination with other materials, as a structural material. For example, the extracted fibers can be embedded within, infiltrated with, coated by, or otherwise combined with a polymer or concrete to form a composite material.

20 Claims, 11 Drawing Sheets

(56) References Cited

U.S. PATENT DOCUMENTS

2022/0412002 A1  12/2022  Hu et al.
2023/0234258 A1   7/2023  Hu et al.

FOREIGN PATENT DOCUMENTS

| KR | 2003-0043985 A | 6/2003 |
| WO | WO 2008/044860 A1 | 4/2008 |
| WO | WO 2009/056009 A1 | 5/2009 |
| WO | WO 2011/157516 | 12/2011 |
| WO | WO 2015/185688 | 12/2015 |
| WO | WO 2019/055789 A1 | 3/2019 |

OTHER PUBLICATIONS

International Search Report and Written Opinion, mailed Sep. 10, 2021, in International Application No. PCT/US21/28333. (11 pages).

Agrawal et al., "Activation energy and crystallization kinetics of untreated and treated oil palm fibre reinforced phenol formaldehyde composites," *Materials Science and Engineering*, 2000, A277: pp. 77-82. (6 pages).

Chen et al., "Rapid Processing of Whole Bamboo with Exposed, Aligned Nanofibrils toward a High-Performance Structural Material," *ACS Nano*, Apr. 2020, 14: pp. 5194-5202. (9 pages).

CN Office Action, issued Dec. 11, 2023 (Dec. 11, 2023), in Chinese Patent Application No. 202180042253.3. (17 pages).

CN Office Action, issued Jun. 26, 2024 (Jun. 26, 2024), in Chinese Patent Application No. 202180042253.3. (22 pages).

Dixon et al., "Comparison of the flexural behavior of natural and thermo-hydromechanically densified Moso bamboo," *Eur. J. Wood. Prod.*, Apr. 2016, 74: pp. 633-642. (10 pages).

EP Office Action, issued Feb. 27, 2024 (Feb. 27, 2024), in European Application No. 21793302.7. (10 pages).

EP Office Action, issued Nov. 25, 2024 (Nov. 25, 2024), in European Application No. 21793302.7. (6 pages).

Gan et al., "Single-digit-micrometer thickness wood speaker," *Nature Communications*, Nov. 2019, 10: paper No. 5084. (8 pages).

Guo et al., "Processing bulk natural bamboo into a strong and flame-retardant composite material," *Industrial Crops & Products*, Jun. 2019, 138: 111478. (10 pages).

ID Office Action, issued Nov. 25, 2024 (Nov. 25, 2024), in Indonesian Application No. P00202213006. (5 pages).

Kalali et al., "Highly-aligned cellulose fibers reinforced epoxy composites derived from bulk natural bamboo," *Industrial Crops & Products*, 2019 (available online Dec. 2018), 129: pp. 434-439. (6 pages).

Kumar et al., "Engineered bamboo scrimber: Influence of density on the mechanical and water absorption properties," *Construction and Building Materials*, Oct. 2016, 127: pp. 815-827. (13 pages).

Osorio et al., "In-depth study of the microstructure of bamboo fibres and their relation to the mechanical properties," *Journal of Reinforced Plastics & Composites*, Jun. 2018, 37(17): pp. 1099-1113. (15 pages).

Park, Choong Nyeon, "Flattening of Bamboo by Thermo mechanical Treatment," *10th World Bamboo Congress, Korea* 2015, 2015. (7 pages).

SG Office Action, issued Jun. 14, 2024 (Jun. 14, 2024), in Singapore Application No. 11202254228E. (13 pages).

Sharma et al., "Effect of processing methods on the mechanical properties of engineered bamboo," *Construction and Building Materials*, Mar. 2015, 83: pp. 95-101. (7 pages).

Sharma et al., "Engineered bamboo for structural applications," *Construction and Building Materials*, Feb. 2015, 81: pp. 66-73. (8 pages).

Valadez-Gonzalez et al., "Chemical modification of henequen fibers with an organosilane coupling agent," *Composites: Part B*, 1999, pp. 321-331. (11 pages).

Yang et al., "Effects of different thermal modification media on physical and mechanical properties of moso bamboo," *Construction and Building Materials*, May 2016, 119: pp. 251-259. (9 pages).

JP Office Action, issued Apr. 15, 2025 (Apr. 15, 2025), in Japanese Application No. 2022-564338. (9 pages).

IN Office Action, issued Nov. 20, 2025 (Nov. 20, 2025), in Indian Application No. 202227065387. (8 pages).

KR Office Action, issued Dec. 12, 2025 (Dec. 12, 2025), in South Korean Application No. 10-2022-7040759. (16 pages).

Vessel (524)

Fiber bundle (526)

Parenchyma cells (522)

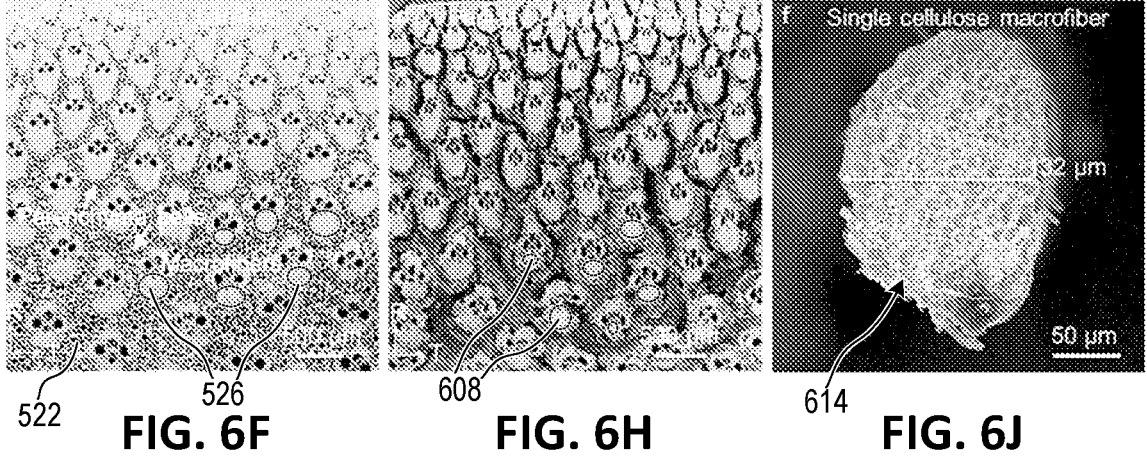
522    526                608                614
FIG. 6F          FIG. 6H          FIG. 6J
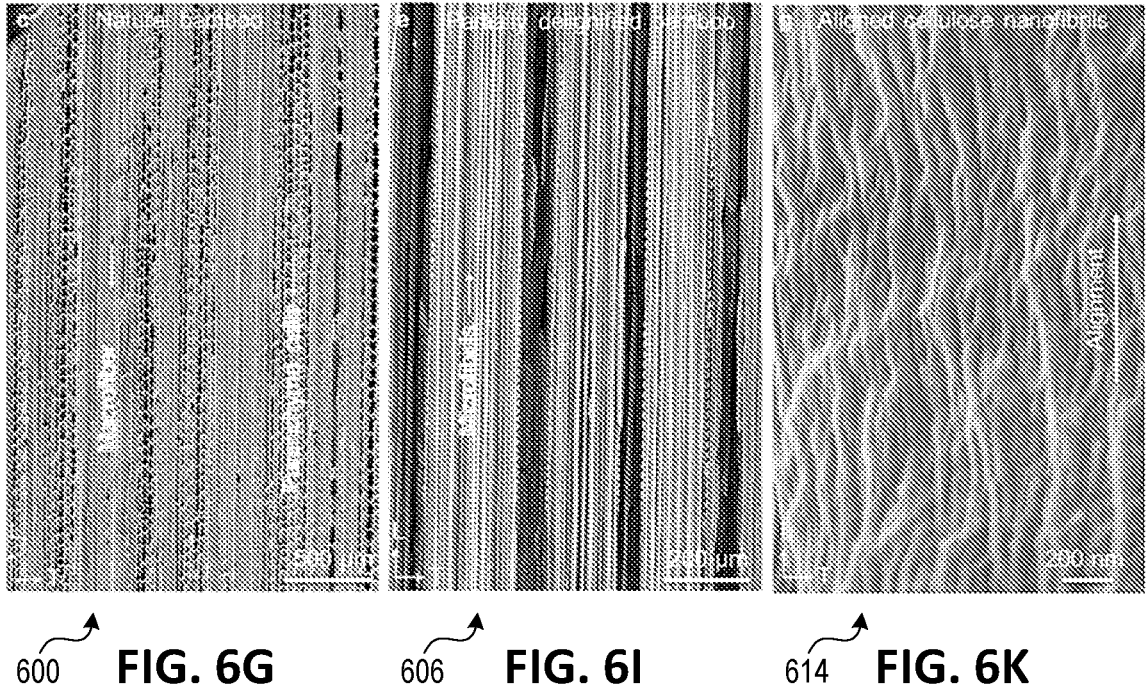
600  FIG. 6G   606  FIG. 6I   614  FIG. 6K

700
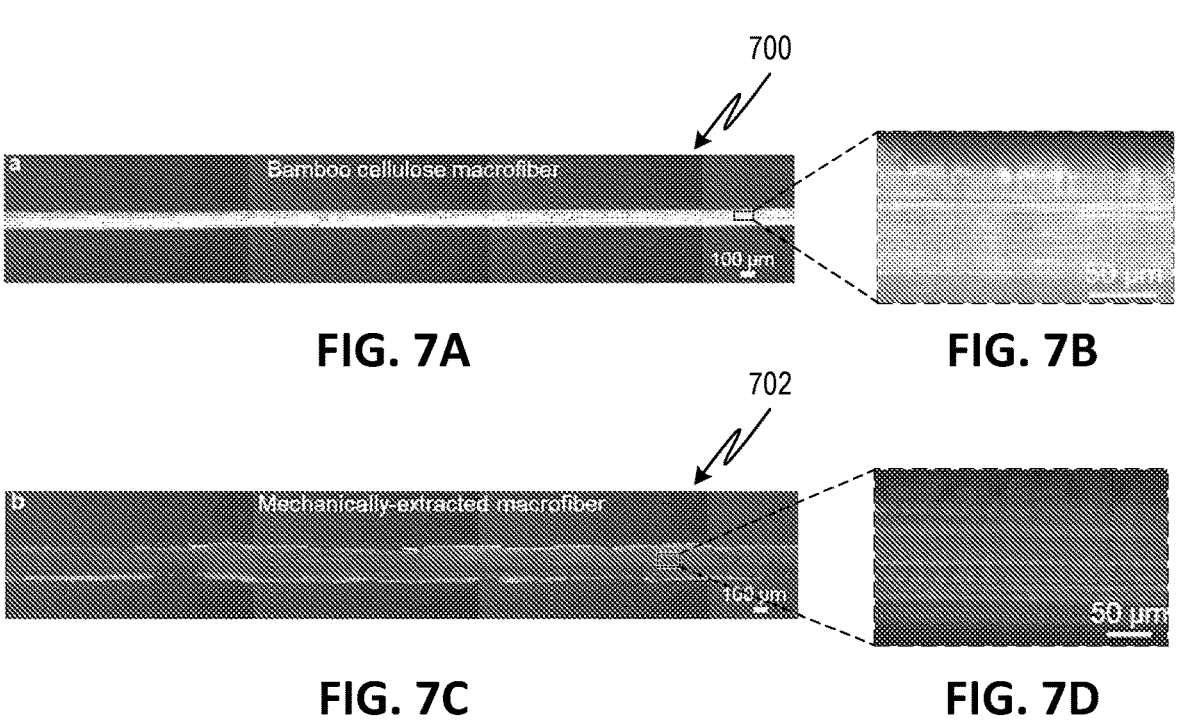
FIG. 7A
FIG. 7B
702
FIG. 7C
FIG. 7D
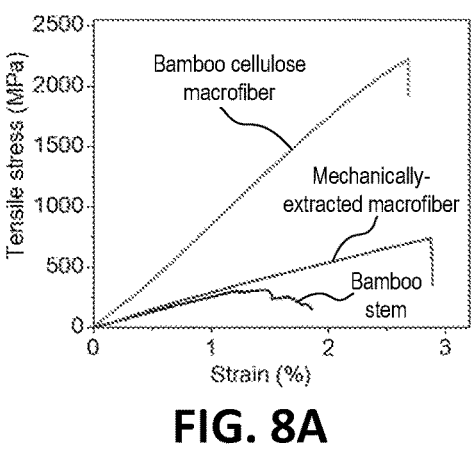
FIG. 8A
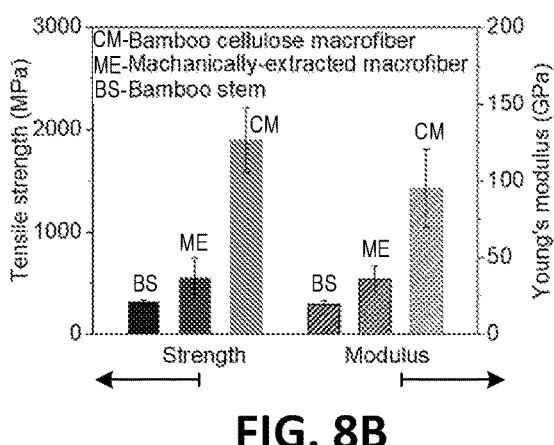
FIG. 8B
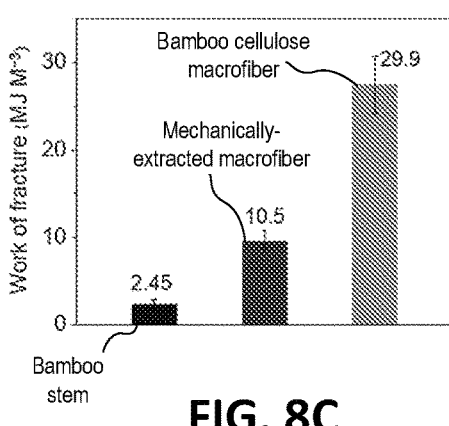
FIG. 8C
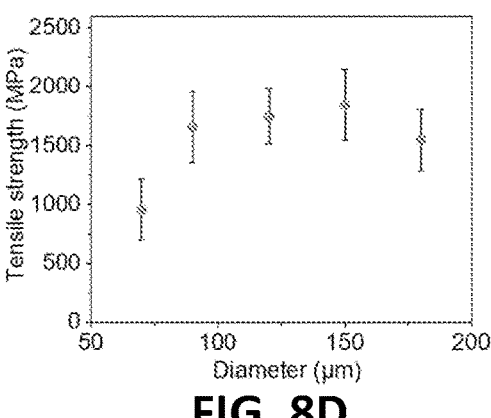
FIG. 8D

902                    900

904

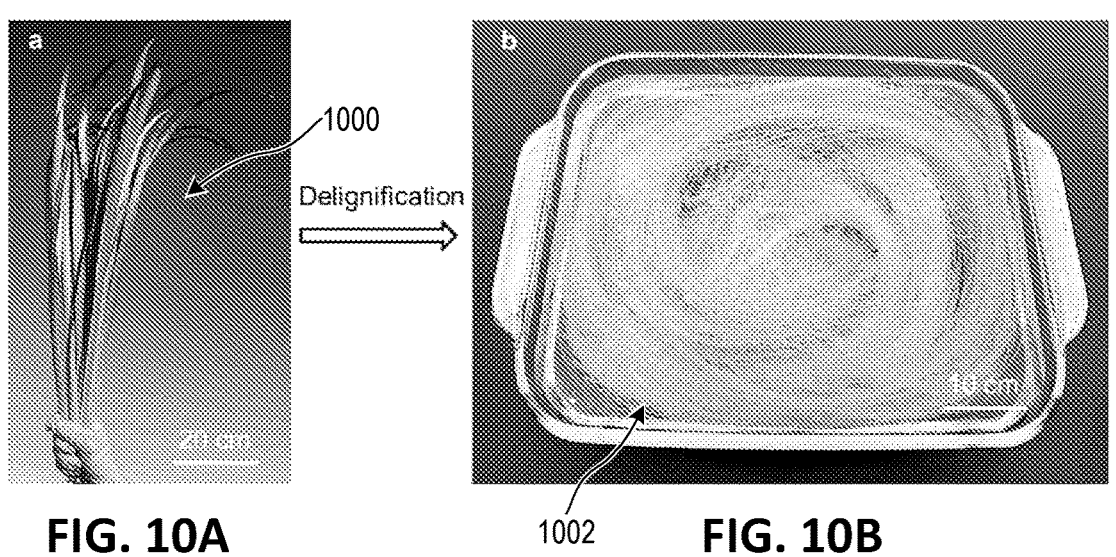
FIG. 10A
Delignification
FIG. 10B
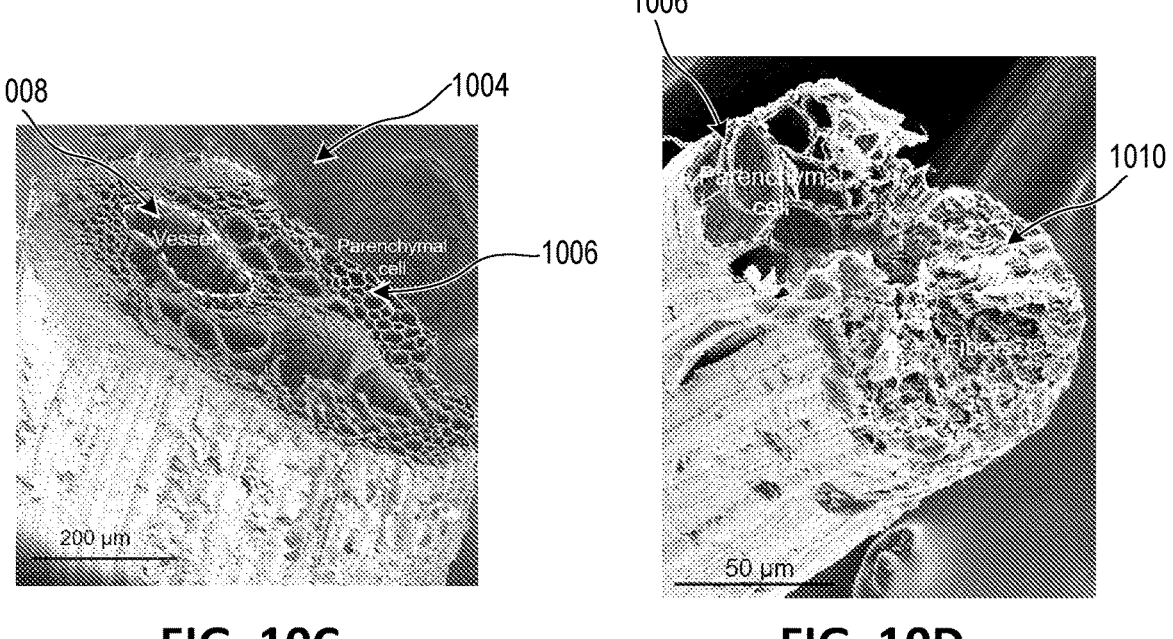
FIG. 10C
FIG. 10D
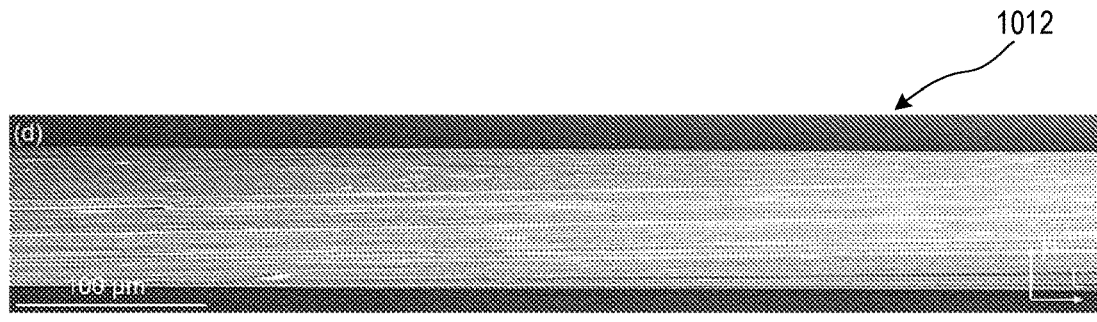
FIG. 10E

EXTRACTION OF DELIGNIFIED, CELLULOSE-BASED FIBERS FROM NATURAL PLANT MATERIAL, AND MATERIALS INCORPORATING SUCH FIBERS

CROSS-REFERENCE TO RELATED APPLICATION

The present application claims the benefit of U.S. Provisional Application No. 63/013,401, filed Apr. 21, 2020, entitled "Strong, Delignified Fibers, Methods of Making and Using the Same," and U.S. Provisional Application No. 63/065,994, filed Aug. 14, 2020, entitled "Decoupled Fluidic Transport Materials and Methods of Preparing the Same," each of which is incorporated by reference herein in its entirety.

FIELD

The present disclosure relates generally to processing of naturally-occurring cellulose-based materials, and more particularly, to extraction of delignified, cellulose-based fibers from fibrous plant materials and use thereof in structural materials and devices.

SUMMARY

Embodiments of the disclosed subject matter provide a simple, cost-effective "top-down" method of fabricating strong, tough fibers by chemically-extracting cellulose-based macrofibers (e.g., having a diameter of at least 5 µm) from natural plant materials. For example, the natural plant material can be bamboo, gladiolus, reed, or other grasses. In some embodiments, the fabrication method comprises a two-step delignification process. In a first step, the natural plant material is treated with an alkali solution of one or more chemicals in order to partially remove lignin and hemicellulose from the plant material. In a second step, the partially-delignified plant material can be treated with a different solution of one or more chemicals in order to further remove lignin and hemicellulose. Alternatively, in some embodiments, the fabrication method comprises a single-step delignification process using a single solution of one or more chemicals. In either case, the delignified plant material can be rinsed and agitated, resulting in release of the cellulose-based macrofibers from each other. In some embodiments, subsequent drying of the released macrofibers can result in self-densification, which can further improve the mechanical properties of the macrofibers. The resulting macrofibers can be employed as independent structural components (e.g., rope, cable, etc.) or as reinforcement to a matrix or base material (e.g., forming a composite material).

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

FIGS. 6F-6G are SEM images showing top and cross-sectional side views, respectively, of a natural bamboo stem.

FIGS. 6H-6I are SEM images showing top and cross-sectional side views, respectively, of a bamboo stem after partial delignification (e.g., 10 hours of chemical treatment), according to one or more embodiments of the disclosed subject matter.

FIG. 6J-6K are SEM images showing top and side views, respectively, of a macroscale fiber extracted from the bamboo stem by delignification and subsequent drying, according to one or more embodiments of the disclosed subject matter.

FIGS. 7A-7B are polarized light microscopy images of a cellulose-based macrofiber extracted from bamboo and a magnified view thereof, according to one or more embodiments of the disclosed subject matter.

FIGS. 7C-7D are polarized light microscopy images of a comparative lignocellulose-based macrofiber mechanically extracted from bamboo and a magnified view thereof.

FIG. 8A is a graph comparing stress-strain curves for cellulose-based macrofibers extracted from bamboo according to embodiments of the disclosed subject matter, lignocellulose-based macrofibers mechanically extracted from bamboo, and natural bamboo stem.

FIG. 8B is a graph comparing tensile strength and Young's modulus for cellulose-based macrofibers extracted from bamboo according to embodiments of the disclosed subject matter, lignocellulose-based macrofibers mechanically extracted from bamboo, and natural bamboo stem.

FIG. 8C is a graph comparing work of fracture for cellulose-based macrofibers extracted from bamboo according to embodiments of the disclosed subject matter, lignocellulose-based macrofibers mechanically extracted from bamboo, and natural bamboo stem.

FIG. 8D is a graph comparing tensile strength cellulose-based macrofibers extracted from bamboo according to embodiments of the disclosed subject matter having different diameters and a gauge length of 2 cm.

FIGS. 10A-10B are images of natural grass and lignocellulose-based macrofibers extracted therefrom, respectively, according to one or more embodiments of the disclosed subject matter.

FIGS. 10C-10D are SEM images showing perspective views of a cross-section of natural grass, and parenchymal cells and fibers thereof, respectively.

FIG. 10E is a light microscopy image of a lignocellulose-based macrofiber extracted from grass, according to one or more embodiments of the disclosed subject matter.

DETAILED DESCRIPTION

General Considerations

Figure 1:
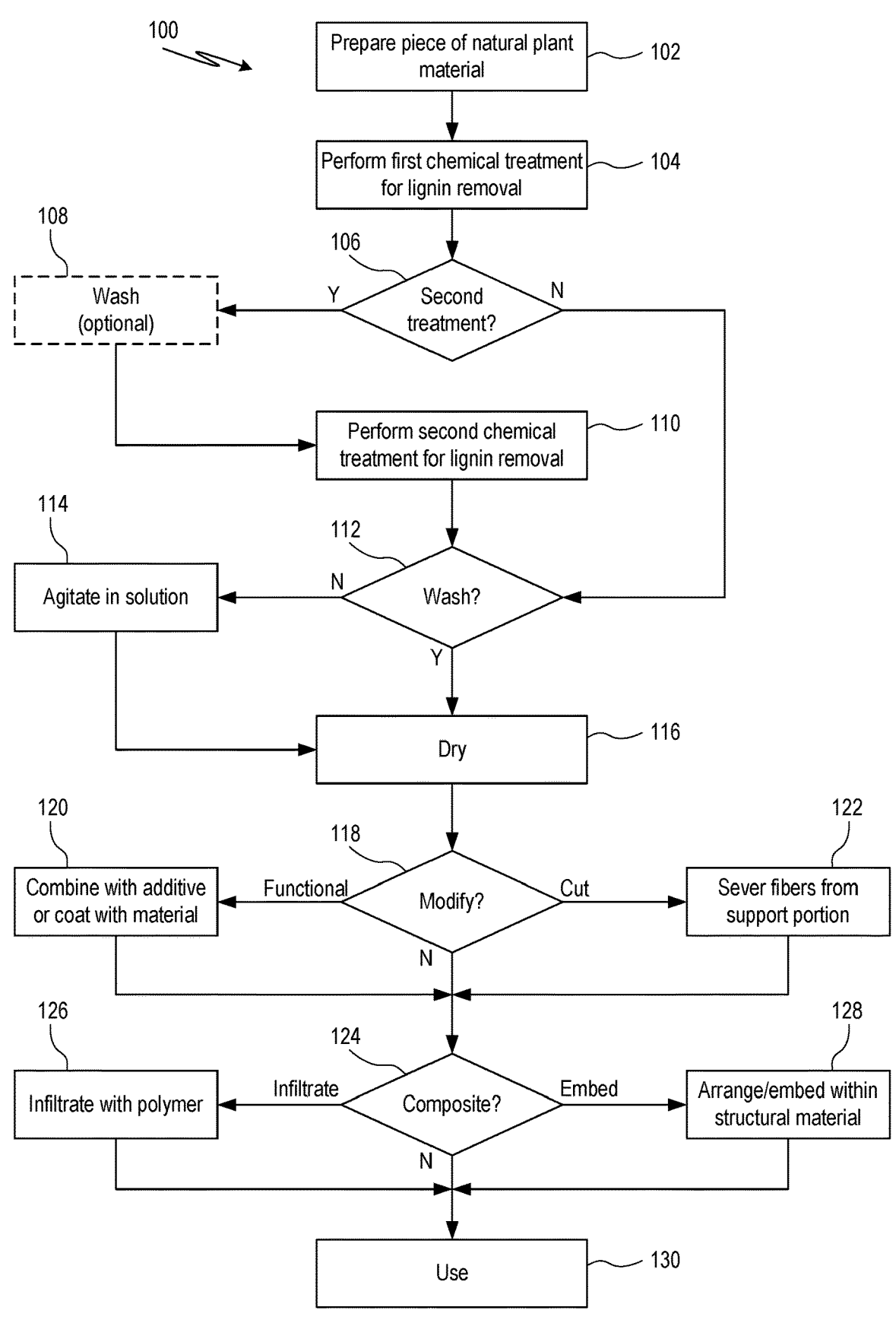
FIG. 1 is an exemplary process flow diagram for a method of extracting and using delignified, cellulose-based macrofibers from natural plant material, according to one or more embodiments of the disclosed subject matter.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and sub-combinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inner," "outer,", "upper," "lower," "top," "bottom," "interior," "exterior," "left," right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including," and the singular forms "a" or "an" or "the" include plural references unless the context clearly dictates otherwise. The term "or" refers to a single element of stated alternative elements or a combination of two or more elements, unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those of ordinary skill in the art in the practice of the disclosed subject matter.

Longitudinal growth direction: A direction along which a plant grows from its roots or from a trunk thereof, with cellulose nanofibers forming cell walls of the plant being generally aligned with the longitudinal growth direction. In some cases, the longitudinal growth direction may be generally vertical or correspond to a direction of its water transpiration stream. This is in contrast to the radial growth direction, which extends from a center portion of the plant outward and may be generally horizontal.

Delignification: The removal of some (e.g., at least 50%) or substantially all (e.g., at least 90%) of naturally-occurring lignin from the natural plant material. Lignin content within the plant material before and after delignification can be assessed using known techniques in the art, for example, Laboratory Analytical Procedure (LAP) TP-510-42618 for "Determination of Structural Carbohydrates and Lignin in Biomass," Version 08-03-2012, published by National Renewable Energy Laboratory (NREL), and ASTM E1758-01(2020) for "Standard Test Method for Determination of Carbohydrates in Biomass by High Performance Liquid Chromatography," published by ASTM International, both of which are incorporated herein by reference.

Natural plant material: A portion (e.g., a cut portion, via mechanical means or otherwise) of any photosynthetic eukaryote of the kingdom Plantae in its native state as grown. In some embodiments, the natural plant material is a species selected from the Poales order or the Poaceae family. For example, in some embodiments, the natural plant material can be any of bamboo, gladiolus, reed, sugarcane, maize, wheat, rice, jute, hemp, kenaf, ramie, banana, corn, wheat, rice, roselle, rattan, sorghum, sisal, palm, henequene, manila, pineapple, curaua, yucca, cabuja, screw pine, abaca, or agaves. In other embodiments, the natural plant material is a section from any type of fibrous plant that has naturally-formed (e.g., as-grown) macrofibers in a lignin-cellulose matrix.

Bamboo: Any of Bambusoideae, such as but not limited to Moso, *Phyllostachys vivax, Phyllostachys viridis, Phyllostachys bambusoides*, and *Phyllostachys nigra*.

Macrofiber: An elongated structure comprised of a plurality of cellulose microfibrils arranged in parallel and having a maximum cross-sectional direction in a plane perpendicular to a length thereof (also referred to herein as diameter), for example, in a range of 100 μm to 1 mm, inclusive.

Microfibril: A microscale, elongated structure comprised of a plurality of cellulose nanofibrils arranged in parallel, and having a diameter, for example, in a range of 1 μm to 10 μm, inclusive.

Elementary nanofibril: A basic nanoscale, elongated structure comprised of a plurality of polymer molecular chains (e.g., 10-36 chains) stacked in parallel or antiparallel direction, and having a diameter, for example, of 5 nm or less.

Introduction

Natural plants are primarily composed of cellulose, hemicellulose and lignin, in varying amounts depending on the type of plant. In general, cellulose in natural plant material is surrounded by a complex matrix of hemicellulose and lignin, which complicates extraction of the cellulosic material from the natural plant material using conventional mechanical techniques. In contrast, embodiments of the disclosed subject matter provide a "top-down" technique that reduces the lignin and hemicellulose contents in the natural plant material, but with only a modest reduction of the cellulose content. The highly selective lignin and hemicellulose removal allows the extraction of intact natural cellulose-based macrofibers from the plant material with less damage.

In some embodiments, the fabrication method comprises a two-step delignification process. In a first step, the natural plant material is treated with an alkali solution of one or more chemicals in order to partially remove lignin and hemicellulose from the plant material. In a second step, the partially-delignified plant material can be treated with a different solution of one or more chemicals in order to further remove lignin and hemicellulose. Alternatively, in some embodiments, the fabrication method comprises a single-step delignification process using a single solution of one or more chemicals. In either case, the delignified plant material can be rinsed and agitated, resulting in release of the cellulose-based macrofibers from each other. In some embodiments, subsequent drying of the released macrofibers can result in self-densification, which can further improve the mechanical properties of the macrofibers.

The extracted, delignified macrofibers are composed of aligned and densely-packed cellulose microfibrils, resulting in hydrogen bonding and van der Waals forces therebetween with few structural defects, thereby exhibiting improved mechanical properties. For example, a delignified macrofiber having a diameter of 5-1000 μm and a length of 5-200 cm can be constructed with tensile strength of at least 0.5 GPa (e.g., exceeding 1 GPa). In embodiments, the delignified macrofibers can be employed as independent structural components, such as rope, cable, moisture-activated actuator or spring, woven fabric, etc. Alternatively or additionally, in some embodiments, the delignified macrofibers are combined with a matrix or base material, such as a polymer or concrete, to form a composite material. In such embodiments, the delignified macrofibers can act as reinforcing component to the base material.

Method Examples

FIG. 1 illustrates an exemplary method 100 for extraction and use of delignified, cellulose-based macrofibers from natural plant material. In some embodiments, the plant material is bamboo or gladiolus. However, in other embodiments, the plant material can be any other plant that has a natural cellulose-based macrofibers. For example, the plant material could be other types of natural grass of the Poales order or of the Poaceae family.

The method 100 can begin at process block 102, where a piece of natural plant material is provided. For example, the providing of process block 102 can include cutting, removing, or otherwise separating the piece of natural plant material from a parent plant. In some embodiments, the providing can optionally include pre-processing of the piece of natural plant material, for example, cleaning to remove any undesirable material or contamination in preparation for subsequent processing, forming the natural plant material into a particular shape in preparation for subsequent processing, or any combination of the foregoing.

The method 100 can proceed to process block 104, wherein the natural plant material is subjected to a first chemical treatment to remove at least some lignin therefrom, for example, by immersion of the natural plant material (or a portion thereof) in one or more chemical solutions associated with the treatment. In some embodiments, the first chemical treatment can be effective to partially remove (but not fully remove) lignin and hemicellulose from the plant material. In such embodiments, the method 100 can proceed via decision block 106 to process block 110 in order to remove additional lignin and hemicellulose by subjecting the plant material to a second chemical treatment that is different from the first chemical treatment. Alternatively, in some embodiments, the first chemical treatment alone can be effective to remove most (e.g., at least 90%) of the lignin from the plant material. In such embodiments, the method 100 can proceed via decision block 106 directly to decision block 112, as described in further detail below. Prior to proceeding to any second treatment of process block 110, the plant material may optionally be washed or rinsed at process block 108, for example, to remove residual chemicals in the plant material from the first chemical treatment and/or other impurities. For example, the washing of process block 108 can include immersing the plant material (or a portion thereof) in de-ionized (DI) water.

In some embodiments, the first chemical treatment, the second chemical treatment, or both can be performed under vacuum, such that the solution(s) associated with the treatment is encouraged to fully penetrate the cell walls and lumina of the natural plant material. Alternatively, in some embodiments, the first chemical treatment, the second chemical treatment, or both can be performed under ambient pressure conditions or elevated pressure conditions (e.g., ~6-8 bar). In some embodiments, the first chemical treatment, the second chemical treatment, or both can be performed at any temperature between ambient (e.g., ~23° C.) and an elevated temperature where the solution associated with the chemical treatment is boiling (e.g., 70-160° C.). In some embodiments, the solution can be agitated to encourage dissolution of the lignin and hemicellulose matrix, in which the desired cellulose-based macrofibers are embedded.

In some embodiments, the immersion time for the first chemical treatment, the second chemical treatment, or both can range anywhere from 0.1 hours to 96 hours, for example, between 4 hours and 12 hours, inclusive. The amount of time of immersion within the solution may be a function of amount of lignin to be removed, size of the piece, temperature of the solution, pressure of the treatment, and/or agitation. For example, smaller amounts of lignin removal, smaller piece size, higher solution temperature, higher treatment pressure, and agitation may be associated with shorter immersion times, while larger amounts of lignin removal, larger piece size, lower solution temperature, lower treatment pressure, and no agitation may be associated with longer immersion times.

In some embodiments, the solution of the first chemical treatment, the second chemical treatment, or both comprises an alkaline solution. In some embodiments, the solution of the first chemical treatment, the second chemical treatment, or both can include sodium hydroxide (NaOH), lithium hydroxide (LiOH), potassium hydroxide (KOH), sodium sulfite ($Na_2SO_3$), sodium sulfide ($Na_2S$), $Na_nS$ (where n is an integer), urea ($CH_4N_2O$), sodium bisulfate ($NaHSO_3$), sulfur dioxide ($SO_2$), anthraquinone (AQ) ($C_{14}H_8O_2$), methanol ($CH_3OH$), ethanol ($C_2H_5OH$), butanol ($C_4H_9OH$), formic acid ($CH_2O_2$), hydrogen peroxide ($H_2O_2$), acetic acid ($CH_3COOH$), butyric acid ($C_4H_8O_2$), peroxyformic acid ($CH_2O_3$), peroxyacetic acid ($C_2H_4O_3$), ammonia ($NH_3$), tosylic acid (p-TsOH), sodium hypochlorite (NaClO), sodium chlorite ($NaClO_2$), chlorine dioxide ($ClO_2$), chorine ($Cl_2$), or any combination of the above.

For example, the chemical solution of the first chemical treatment can include, but is not limited to, NaOH, NaOH+$Na_2SO_3$, NaOH+$Na_2S$, NaOH+urea, $NaHSO_3$+$SO_2$+$H_2O$, $NaHSO_3$+$Na_2SO_3$, NaOH+$Na_2SO_3$, $Na_2SO_3$+AQ, NaOH+$NaHSO_3$+AQ, NaOH+$Na_2S$+AQ, NaOH+$Na_2SO_3$+AQ, $NaHSO_3$+$SO_2$+AQ, $Na_2SO_3$+NaOH+$CH_3OH$+AQ, $NaHSO_3$+$Na_2SO_3$+AQ, NaOH+$Na_2S$, where AQ is Anthraquinone, or any of the foregoing substituting LiOH or KOH for NaOH, or combinations thereof. For example, the chemical solution of the second chemical treatment can include, but is not limited to, $O_2$, $O_3$, $Cl_2$, $ClO_2$, $H_2O_2$, $NaClO_2$, NaClO, $Ca(ClO)_2$, NaOH+$H_2O_2$, $O_2$+$H_2O_2$, CHOOH+$H_2O_2$, $CH_3COOH$+$H_2O_2$, $C_2H_5COOH$+$H_2O_2$, $C_3H_7COOH$+$H_2O_2$, or any combination of the foregoing.

In one non-limiting example, the first chemical treatment can include immersing the natural plant material (or a portion thereof) in a solution comprising a mixture of potassium hydroxide (KOH) and sodium sulfite ($Na_2SO_3$), potassium hydroxide (KOH) and sodium sulfide ($Na_2S$), sodium hydroxide (NaOH) and sodium sulfite ($Na_2SO_3$), or sodium hydroxide (NaOH) and sodium sulfide ($Na_2S$), and the second chemical treatment can include immersing the plant material (or a portion thereof) in a solution comprising a mixture of hydrogen peroxide ($H_2O_2$) with acetic acid ($C_2H_4O_2$) or formic acid ($CH_2O_2$). In another non-limiting example, the first chemical treatment can include immersing the piece of natural plant material (or a portion thereof) in peroxyformic acid ($CH_2O_3$), and the second chemical treatment can include immersing the piece of plant material (or a portion thereof) in a solution comprising sodium hydroxide (NaOH) or potassium hydroxide (KOH).

In another non-limiting example involving bamboo as the natural plant material, the first chemical treatment can include immersing the piece of bamboo (or a portion thereof) in a solution of NaOH (e.g., 10 wt %) and $Na_2SO_3$ (e.g., 5 wt %) at 70° C. for 4 hours, and the second chemical treatment can include immersing the piece of bamboo (or a portion thereof) in a solution of $H_2O_2$ (e.g., 10 wt %) and acetic acid (e.g., 10 wt %) solution at 60° C. for 4 hours. In another non-limiting example involving gladiolus as the natural plant material, the first chemical treatment can include immersing the piece of gladiolus (or a portion thereof) in a solution of NaOH (e.g., 10 wt %) and $Na_2SO_3$ (e.g., 5 wt %) at 70° C. for 6 hours, and the second chemical treatment can include immersing the piece of bamboo (or a portion thereof) in a solution of $H_2O_2$ (e.g., 5 wt %) and acetic acid (e.g., 2 wt %) solution.

The delignification of the first and second chemical treatments, or in some embodiments the first chemical treatment alone, results in removal of most of the lignin (e.g., at least 90%) and/or most of the hemicellulose (e.g., at least 90%) from the natural plant material while retaining most (e.g., at least 90%) of the cellulose. For example, after the first and second chemical treatments, the delignified plant material can have a lignin content that is less than or equal to 10 wt % (e.g., ≤5 wt % or ≤3 wt %), a hemicellulose content that is less than or equal to 10 wt % (e.g., ≤6 wt %), a cellulose content of at least 70 wt % (e.g., ≥85 wt %), or any combination of the foregoing.

The method 100 can thus proceed from process block 110 or decision block 106 to decision block 112, where it is determined if washing or rinsing is desired. If washing is desired, the method 100 can proceed to process block 114, where rising is performed. For example, the delignified plant material can be partially or fully immersed in one or more rinsing solutions. The rinsing solution can be a solvent, such as but not limited to, de-ionized (DI) water, alcohol (e.g., ethanol, methanol, isopropanol, etc.), or any combination thereof. For example, the rinsing solution can be formed of equal volumes of water and ethanol. The rinsing of process block 114 can be performed with agitation, for example, to collapse any remaining matrix of lignin and hemicellulose and thereby expose the retained cellulose-based macrofibers. Alternatively or additionally, in some embodiments, plant material includes a support portion that is not subjected to delignification that remains attached to the cellulose-based macrofibers. During subsequent drying of the plant material, the exposed macrofibers can self-separate due to the rooting within the support portion and self-densification.

Once the rinsing of process block 114 has been completed, or if rinsing was not desired at decision block 112, the method 100 can proceed to process block 116, where the plant material and any exposed macrofibers are dried. The drying of process block 116 can include any of conductive, convective, and/or radiative heating processes, including but not limited to an air-drying process, a vacuum-assisted drying process, an oven drying process, a freeze-drying process, a critical point drying process, a microwave drying process, or any combination of the above. For example, an air-drying process can include allowing the delignified plant material to naturally dry in static or moving air, which air may be at any temperature, such as room temperature (e.g., 23° C.) or at an elevated temperature (e.g., greater than 23° C.). For example, a vacuum-assisted drying process can include subjecting the delignified plant material to reduced pressure, e.g., less than 1 bar, for example, in a vacuum chamber or vacuum oven. For example, an oven drying process can include using an oven, hot plate, or other conductive, convective, or radiative heating apparatus to heat the delignified plant material at an elevated temperature (e.g., greater than 23° C.), for example, 70° C. or greater. For example, a freeze-drying process can include reducing a temperature of the delignified plant material to below a freezing point of the fluid therein (e.g., less than 0° C.), then reducing a pressure to allow the frozen fluid therein to sublime (e.g., less than a few millibars). For example, a critical point drying process can include immersing the delignified plant material in a fluid (e.g., liquid carbon dioxide), increasing a temperature and pressure of the bamboo segment past a critical point of the fluid (e.g., 7.39 MPa, 31.1° C. for carbon dioxide), and then gradually releasing the pressure to remove the now gaseous fluid. For example, a microwave drying process can include using a microwave oven or other microwave generating apparatus to induce dielectric heating within the delignified plant material by exposing it to electromagnetic radiation having a frequency in the microwave regime (e.g., 300 MHz to 300 GHz), for example, a frequency of ~915 MHz or ~2.45 GHz.

In some embodiments, the drying can be such that any fluid retained in the macrofibers from the chemical treatments and/or rinsing evaporates. In such embodiments, the capillary effects of the evaporation can cause the microfibrils of each macrofiber to pull together, thereby causing self-densification of the macrofiber. For example, the drying can be such that a volume of each cellulose-based macrofiber decreases by at least 10%. After the drying of process block 116, each macrofiber can have a moisture content less than or equal to 10 wt % (e.g., ≤5 wt %). In some embodiments, the dried macrofibers can have a density of at least 0.8 g/cm³ (e.g., ≥1 g/cm³).

In some embodiments, the delignified cellulose-based macrofibers extracted from the natural plant material by the above-described portions of method 100 can have a length of at least 5 cm (e.g., 5-200 cm, inclusive), a diameter (e.g., a maximum cross-sectional dimension in a plane perpendicular to a direction of the length) of at least 5 μm (e.g., 5 μm to 1 mm, inclusive, and/or at least 100 μm), or any combination of the foregoing. The delignified cellulose-based macrofibers extracted from the natural plant material by the above-described portions of method 100 can also enjoy enhanced mechanical properties. For example, the delignified cellulose-based macrofibers can have a specific strength of at least 0.5 GPa·cm³/g (e.g., ≥1 GPa·cm³/g), a crystallinity of at least 40% (e.g., ≥50%), a tensile strength of at least 0.5 GPa (e.g., ≥1 GPa), a Young's modulus of at least 20 GPa (e.g., ≥40 GPa, or ≥60 GPa), or any combination the foregoing.

Returning to FIG. 1, the method 100 can proceed from process block 116 to decision block 118, where it is determined if the delignified cellulose macrofibers should be subjected to one or more modifications. For example, when the plant material included a support portion to which a longitudinal end of each macrofiber remains coupled, the method 100 can proceed from decision block 118 to process block 122, where the macrofibers are severed (e.g., by cutting) from the support portion.

Alternatively or additionally, the delignified cellulose macrofibers can be modified by the introduction of one or more functional materials at process block 120. In some embodiments, the functional materials can be introduced into the internal micro- or nano-structure of the macrofibers, and/or the functional materials can be coated over external surface of the macrofibers. For example, the functional materials can include, but are not limited to, conductive materials (e.g., carbon nanotubes, graphene, polypyrrole (PPy), polyaniline (PANI), poly(3,4-ethylenedioxythio-phene) (PEDOT), silver nanoparticles or nanowire, silver, copper, indium tin oxide (ITO), aluminum-doped zinc oxide (AZO), etc.), magnetic materials (e.g., AlNi(Co), FeCr(Co), FeCrMo, FeAlC, FeCrCo, PtC, etc.), piezoelectric materials (e.g., $BaTiO_3$ (BT), lead zirconate titanate (PZT), lead-barium metaniobate (PBLN), quartz, polyvinylidene difluo-ride (PVDF), etc.), stimuli-response materials (e.g., ceramic matrix composite (CMC), polyvinyl alcohol (PVA), poly-ethylene oxide (PEO), polyurethane (PU), epoxy), catalytic materials (ZnO, $TiO_2$, $Fe_2O_3$, $SnO_2$, $Co_3O_4$, $LaFeO_3$, $LaCoO_3$ etc.), or any combination of the foregoing. In some embodiments, the modification of process block 120 can include, but is not limited to, spin-coating, in-situ growth, sol-gel coating, dip-coating, spray-coating, chemical vapor deposition (CVD), physical vapor deposition (PVD), evapo-ration-coating, sputter-coating, immersed growth, or any combination of the foregoing.

After the severing of process block 122 and the modifi-cation of process block 120, or if no modification was desired at decision block 118, the method 100 can proceed to decision block 124, where it is determined if the macro-fibers should be combined with other materials to form a composite. In some embodiments, the macrofibers can be infiltrated and/or coated with a polymer at process block 126 to form a composite structure. Alternatively or additionally, the macrofibers can be embedded or encased within a matrix or base material at process block 128 to form a composite structure. In some embodiments, the base material of the composite structure can be a polymer or concrete, and the embedded macrofibers can provide reinforcement to the base material. After process block 126, process block 128, or both, a content of the macrofibers within the composite structure can be at least 0.1 wt % (e.g., 0.5 wt % to ~80 wt %).

For example, the polymer for the composite structure (e.g., process block 126 or process block 128) can be epoxy resin, polyvinyl alcohol (PVA), polyethylene glycol (PEO), polyamide (PA), polyethylene terephthalate (PET), poly-butylene terephthalate (PBT), polytrimethylene terephtha-late (PTT), polyacrylonitrile (PAN), polycaprolactam (PA6), poly(m-phenylene isophthalamide) (PMIA), poly-p-phe-nylene terephthalamide (PPTA), polyurethane (PU), poly-carbonate (PC), polypropylene (PP), high-density polyeth-ylene (HDPE), polystyrene (PS), polycaprolactone (PCL), polybutylene succinate (PBS), polybutylene adipate tereph-thalate (PBAT), poly(butylene succinate-co-butylene adi-pate) (PBSA), polyhydroxybutyrate (PHB), poly(3-hy-droxybutyrate-co-3-hydroxyvalerate) (PHBV), poly (glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), poly-ethylene (PE), polyvinyl chloride (PVC), poly(methyl meth-acrylate) (PMMA), acrylonitrile butadiene styrene (ABS), polyimide (PI), polyethylenimine (PEI), polylactic acid (PLA), octadecyltrichlorosilane (OTS), polyoctahedral sils-esquioxane (POSS), paramethylstyrene (PMS), polydimeth-ylsiloxane (PDMS), poly(ethylene naphthalate) (PEN), a graft copolymer of acrylonitrile-butadiene-styrene-methyl-methacrylate (ABSM), dodecyltrimethoxysilane (DTMS), rosin, chitin, chitosan, protain, plant oil, lignin, hemicellu-lose, carboxymethyle cellulose, cellulose acetate, starch, agar, alginic acid, or any combination of the foregoing. For example, the concrete for the composite structure (e.g., process block 128) can be Portland cement, Agro-concrete, $MgCO_3$, $Mg(OH)_2$, or any combination of the foregoing.

After the infiltration of process block 126 and the embed-ding of process block 128, or if no composite formation was desired at decision block 124, the method 100 can proceed to process block 130, where the macrofibers (or composite structure containing the macrofibers) is subject to use. For example, in some embodiments, the delignified macrofibers can be employed as independent structural components, such as rope, cable, moisture-activated actuator or spring, woven fabric, etc. Alternatively or additionally, in some embodiments, the macrofiber-reinforced composite can be employed as a structural material, for example, in building construction, packaging, transportation vehicles (e.g., auto-motive, train, aerospace), electronics housing, robotics, etc. Other applications beyond those specifically listed are also possible for the delignified macrofibers fabricated according to the disclosed technology. Indeed, one of ordinary skill in the art will readily appreciate that the delignified macrofi-bers disclosed herein can be adapted to other applications based on the teachings of the present disclosure.

Although blocks 102-130 of method 100 have been described as being performed once, in some embodiments, multiple repetitions of a particular process block may be employed before proceeding to the next decision block or process block. For example, the washing of process block 108 and/or process block 114 may be performed more than once, with a fresh washing solution provided for each iteration. In addition, although blocks 102-130 of method 100 have been separately illustrated and described, in some embodiments, process blocks may be combined and per-formed together (simultaneously or sequentially). Moreover, although FIG. 1 illustrates a particular order for blocks 102-130, embodiments of the disclosed subject matter are not limited thereto. Indeed, in certain embodiments, the blocks may occur in a different order than illustrated or simultaneously with other blocks.

Macrofiber Configuration and Composite Examples

Figures 2A, 2B, 2C, 2D, 3A, 3B, 3C, 3D:
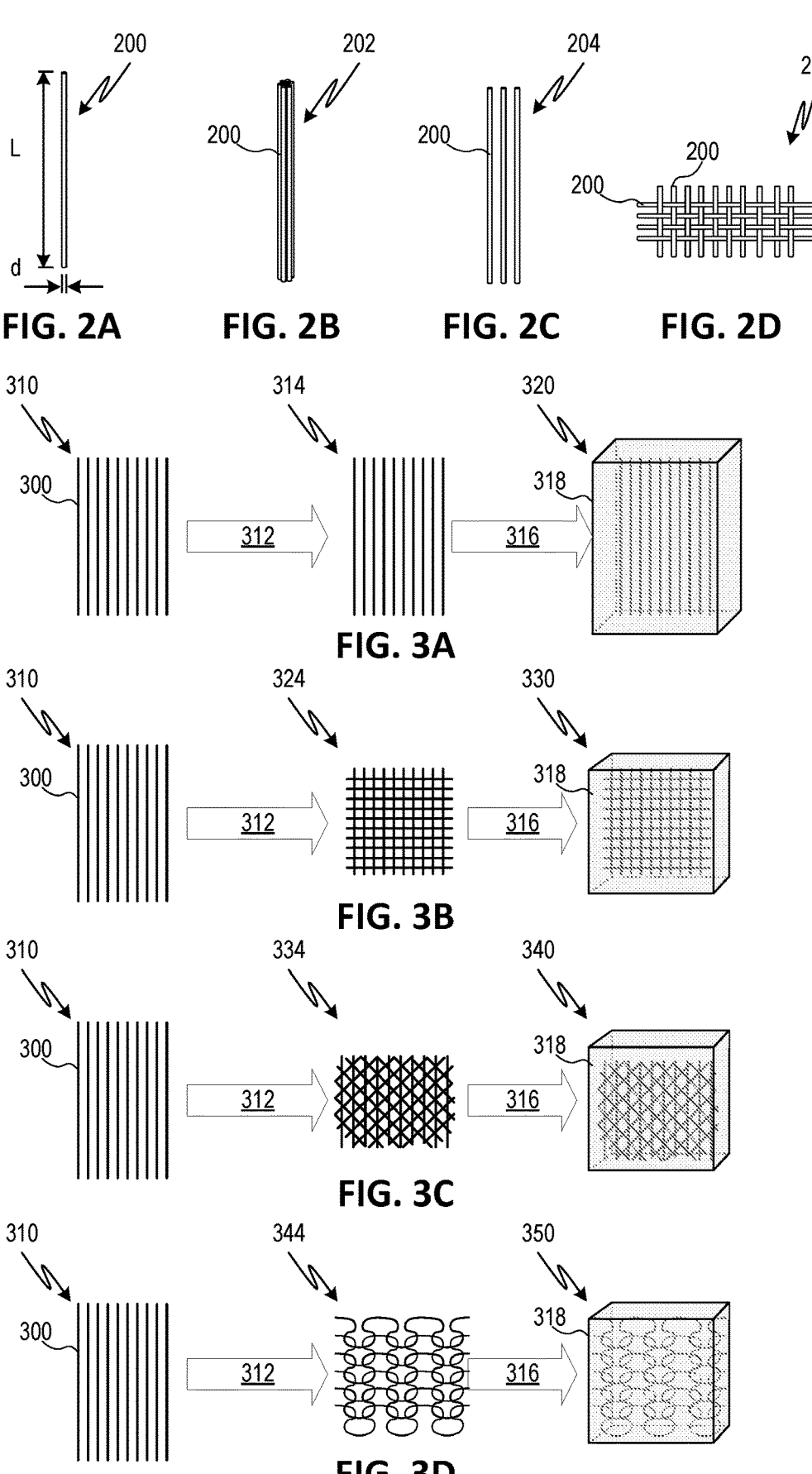
FIG. 2A is a simplified schematic diagram of a delignified, cellulose-based macrofiber extracted from natural plant material, according to one or more embodiments of the disclosed subject matter.
FIGS. 2B-2D illustrate exemplary configurations for multiple delignified macrofibers as a bundle, one-dimensional array, and a two-dimensional array, respectively, according to one or more embodiments of the disclosed subject matter.
FIGS. 3A-3D illustrate exemplary configurations for composite materials incorporating delignified macrofibers disposed in a non-woven configuration, a biaxial weave, a triaxial weave, and a knitted weave, according to one or more embodiments of the disclosed subject matter.

FIGS. 2A-2D illustrate various configurations for delig-nified, cellulose macrofibers extracted from natural plant materials. In some embodiments, a single macrofiber 200 can be provided for use, as illustrated in FIG. 2A. As noted above, macrofiber 200 can have a length, L, (e.g., extending along a longitudinal growth direction of the original plant material) of at least 5 cm, and a diameter, d, of at least 5 μm (e.g., 5 μm to 1 mm, inclusive, and/or at least 100 μm). Alternatively, in some embodiments, multiple macrofibers 200 can be combined together to form a structure. For example, multiple macrofibers 200 can be arranged together in parallel to form a bundled array 202, as shown in FIG. 2B. In such configurations, the macrofibers of the array 202 can be coupled together artificially, e.g., using glue or epoxy, or naturally, e.g., due to hydrogen bonding between facing surfaces of the macrofibers 200. Alternatively, the macrofi-bers 200 of array 202 can be intertwined with each other, for example, to form a rope or cable.

In some embodiments, multiple macrofibers 200 can be arranged in an array. For example, the macrofibers 200 can be arranged to form a regular 1-D array 204, as shown in FIG. 2C. The array 204 can have equal spacing between adjacent macrofibers in a direction perpendicular to a length direction of the macrofibers. Alternatively or additionally, the macrofibers 200 can be arranged to form a regular 2-D array 206, as shown in FIG. 2D. The array 206 can have equal spacing between adjacent macrofibers in a first direction parallel to a length direction of some of the macrofibers and can have equal spacing between adjacent macrofibers in a second direction perpendicular to the first direction. The spacing in the first direction may be the same or different from the spacing in the second direction. In some embodiments, the macrofibers 200 of the array 206 can be woven or intertwined, for example, to form a fabric. Alternatively or additionally, the macrofibers can be arranged to form a regular 3-D array, for example, by overlaying multiple 2-D arrays 206 and/or by providing another 2-D array with macrofibers extending in a third direction perpendicular to the plane of the 2-D array 206.

In some embodiments, the 1-D, 2-D, or 3-D array of macrofibers can be combined with a base material to form a composite structure. For example, in FIG. 3A, a batch 310 of delignified macrofibers 300 can be arranged in a linear array 314 via process 312. The linear array 314 can then be embedded within or coated by a base material 318 via process 316 to form composite structure 320. In another example, the batch 310 of delignified macrofibers 300 can be arranged in a biaxial weave pattern 324 via process 312, as shown in FIG. 3B. The biaxial weave 324 can then be embedded within or coated by a base material 318 via process 316 to form composite structure 330. In yet another example, the batch 310 of delignified macrofibers 300 can be arranged in a triaxial weave pattern 334 via process 312, as shown in FIG. 3C. The triaxial weave 334 can then be embedded within or coated by a base material 318 via process 316 to form composite structure 340. In still another example, the batch 310 of delignified macrofibers 300 can be arranged in a knitted weave pattern 344 via process 312, as shown in FIG. 3D. The knitted weave 344 can then be embedded within or coated by a base material 318 via process 316 to form composite structure 350.

Other arrangements and configurations for the macrofibers in the composite material are also possible according to one or more contemplated embodiments. For example, the macrofibers in the composite material can have a random arrangement (e.g., with no discernible order or arrangement), a non-regular pattern (e.g., where spacing between adjacent macrofibers varies across the array), a pattern with no spacing (e.g., where facing surfaces of adjacent macrofibers are directly in contact with each other), or any other type of pattern or arrangement.

As noted above, the polymer for the base material 318 in any of FIGS. 3A-3D can be epoxy resin, PVA, PEO, PA, PET, PBT, PTT, PAN, PA6, PMIA, PPTA, PU, PC, PP, HDPE, PS, PCL, PBS, PBAT, PBSA, PHB, PHBV, PGA, PPy, PTh, PVDF, PVF, EVOH, PVDC, MXD6, PE, PVC, PMMA, ABS, PI, PEI, PLA, OTS, POSS, PMS, PDMS, PEN, ABSM, DTMS, rosin, chitin, chitosan, protain, plant oil, lignin, hemicellulose, carboxymethyl cellulose, cellulose acetate, starch, agar, alginic acid or any combination of the above. Alternatively, the base material 318 in any of FIGS. 3A-3D can be a concrete, such as Portland cement, agro-concrete, $MgCO_3$, and $Mg(OH)_2$.

Figure 4A:
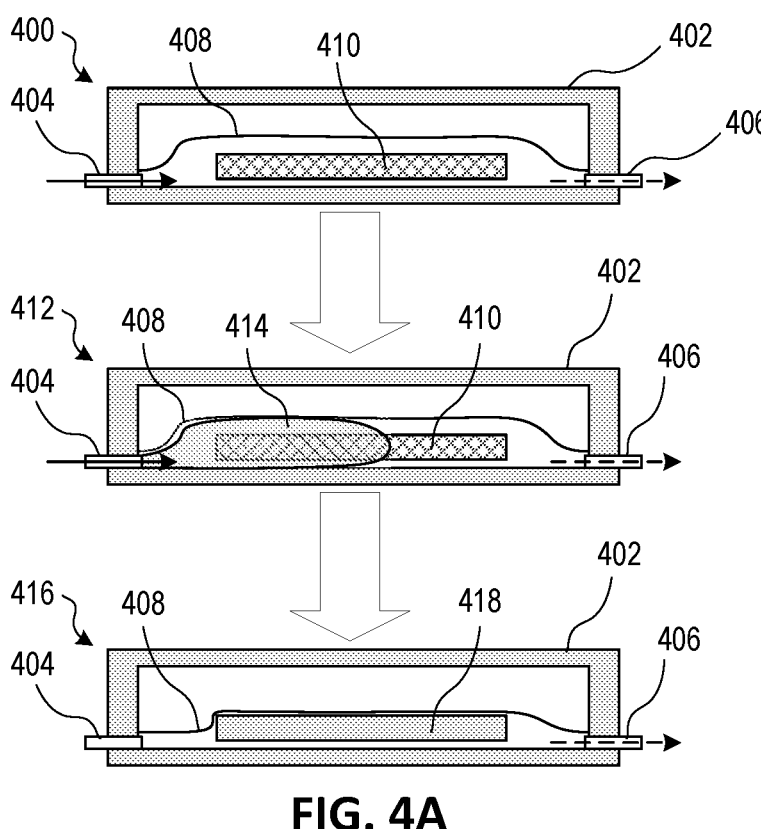
FIG. 4A is a simplified schematic diagram illustrating infiltration of a polymer to delignified macrofibers to form a composite material, according to one or more embodiments of the disclosed subject matter.

In some embodiments, to form the composite structure, the macrofibers arranged in an appropriate pattern can be disposed in a mold, and the base material in a substantially fluid state can be poured into the mold. After curing, the base material can adopt a substantially immobile state (e.g., set solid) with the macrofibers retained therein. In some embodiments, the curing may be performed by applying pressure, heat, or both to the mold. Alternatively or additionally, in some embodiments, the base material can be infiltrated within and/or around the macrofibers by applying a vacuum. For example, FIG. 4A illustrates an exemplary setup 400 for vacuum infiltration of a base material 414, e.g., a polymer, into an arrangement 410 of delignified macrofibers to form a composite material 418. The vacuum infiltration setup 400 can include a housing 402 with an inlet port 404 for inflow of polymer (or polymer precursor) and a vacuum port 406 for application of a vacuum. In some embodiments, the setup 400 can also include a conforming vacuum chamber 408 (e.g., vacuum bag), that will collapse upon application of vacuum to port 404. The collapsed vacuum chamber 408 can narrow or eliminate extraneous volume surrounding the delignified macrofiber arrangement 410, thereby ensuring that polymer 414, as it inflows at 412, primarily infiltrates the macrofibers 410 (e.g., in place of having the macrofibers embedded within the polymer, or at least reducing a distance between an outer surface of the polymer and the macrofibers embedded therein). Once the composite 418 is formed in the final stage 416, the vacuum can be released and the composite removed for further curing or use.

Figure 4B:
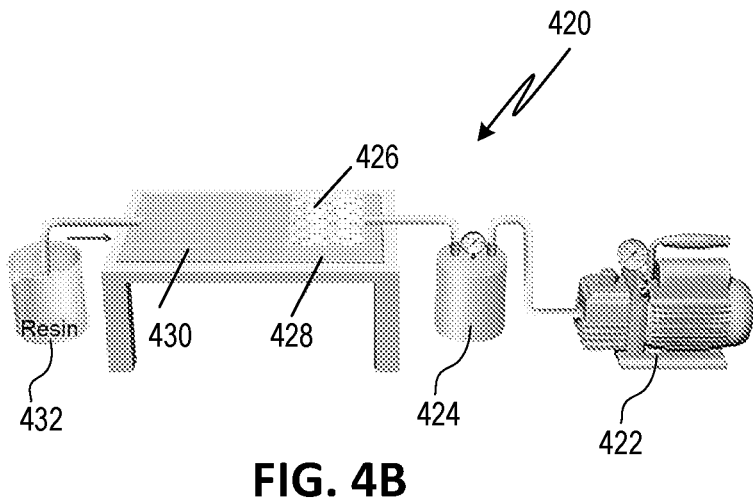
FIG. 4B is a simplified schematic diagram illustrating an exemplary setup for vacuum-assisted resin-transfer molding (VARTM), according to one or more embodiments of the disclosed subject matter.

FIG. 4B illustrates another exemplary setup 420 for performing vacuum infiltration of a base material, e.g., a resin or other polymer, into delignified macrofibers. For example, multiple layers 426 of delignified cellulose macrofibers (e.g., each layer formed as a woven fabric or mat) can be placed in a single-sided, smooth mold 430. The stacked macrofiber layers 426 can be covered by a thin spacer film (e.g., nylon), enclosed in a vacuum bag 428 (e.g., polyethylene), and tightly sealed. Resin can then be introduced to the mold 430 from source 432 by application of vacuum pressure from vacuum pump 422. A resin trap 424 between the vacuum pump 422 and the mold 430 can prevent resin from inadvertently entering and damaging the vacuum pump 422 during operation. The resin infusion by vacuum pressure impregnates and fully infiltrates the cellulose macrofiber stack, thereby forming a composite structure, after which the composite can be removed to a hot press for final curing of the resin, for example, as a pressure of 13 MPa and temperature of 150° C.

Fabricated Examples and Experimental Results

Extracted Bamboo Fibers

Figure 5A:
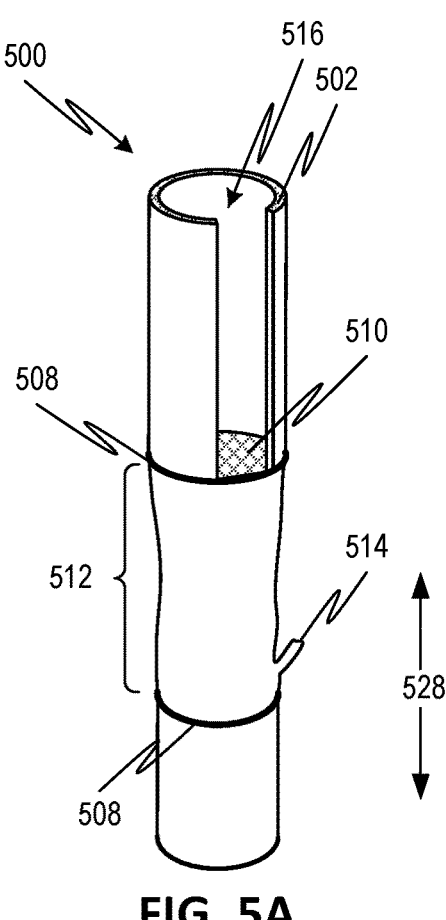
FIG. 5A is a simplified partial cut-away view of a natural bamboo segment from which cellulose-based fibers can be extracted, according to one or more embodiments of the disclosed subject matter.

Cellulose macrofibers can be extracted from a piece of natural bamboo by delignification using one or more chemical treatments. FIG. 5A shows a partial cutaway view of a bamboo segment 500 in its naturally-occurring state. The segment 500 has a culm wall 502 surrounding a hollow interior region 516, which is divided along a length of the culm wall 502 into internal nodal regions 512 by nodes 08 formed by an internal nodal diaphragm 510. The culm wall 502 has fibers extending along a longitudinal direction 528 (e.g., bamboo growth direction or a direction substantially parallel to an axis defined by the hollow interior region 516) of the bamboo segment 500) that are embedded in a lignin matrix. One or more branch stubs 514 can extend from a particular internal nodal region 512 and can serve as the root from which a culm wall for a new bamboo segment may grow (e.g., thus defining a different longitudinal direction for the new segment).

Figure 5B:
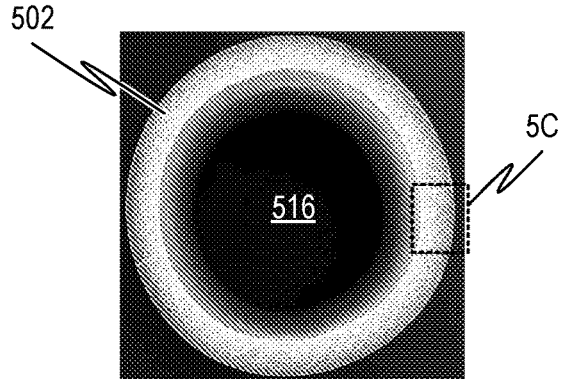
FIG. 5B is a top view image of a cross-section of a natural bamboo segment.
Figure 5C:
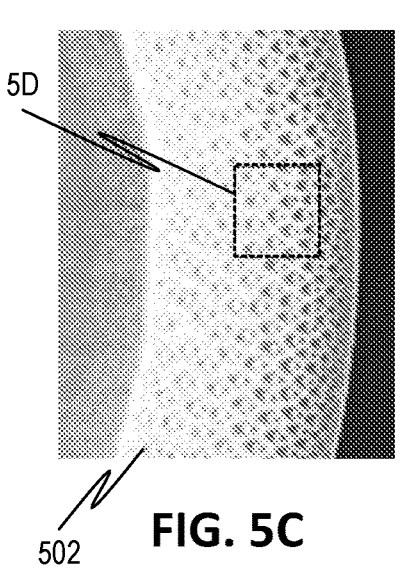
FIG. 5C is a magnified image of the culm of the natural bamboo segment of FIG. 5B.
Figure 5D:
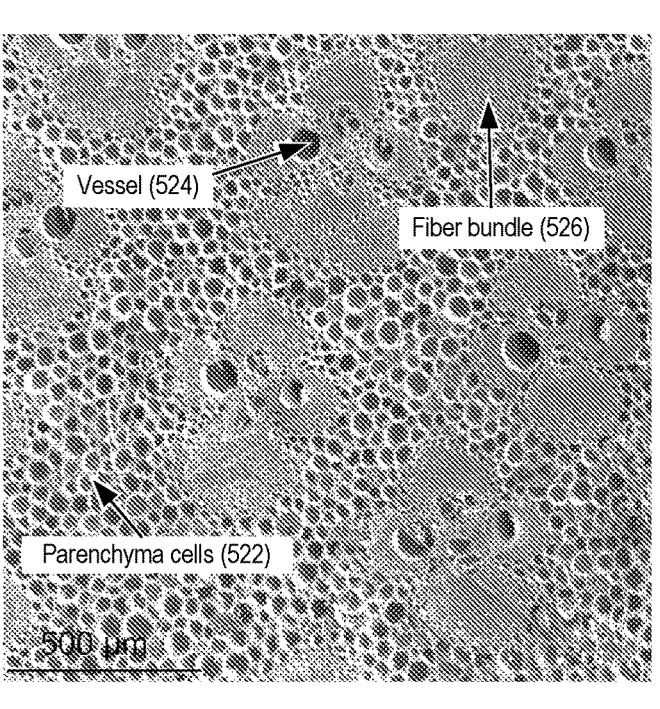
FIG. 5D is a further magnified scanning electron microscope (SEM) image showing the hierarchical microstructure of the culm wall of FIG. 5C.
Figures 5E, 5F, 5G, 5H:
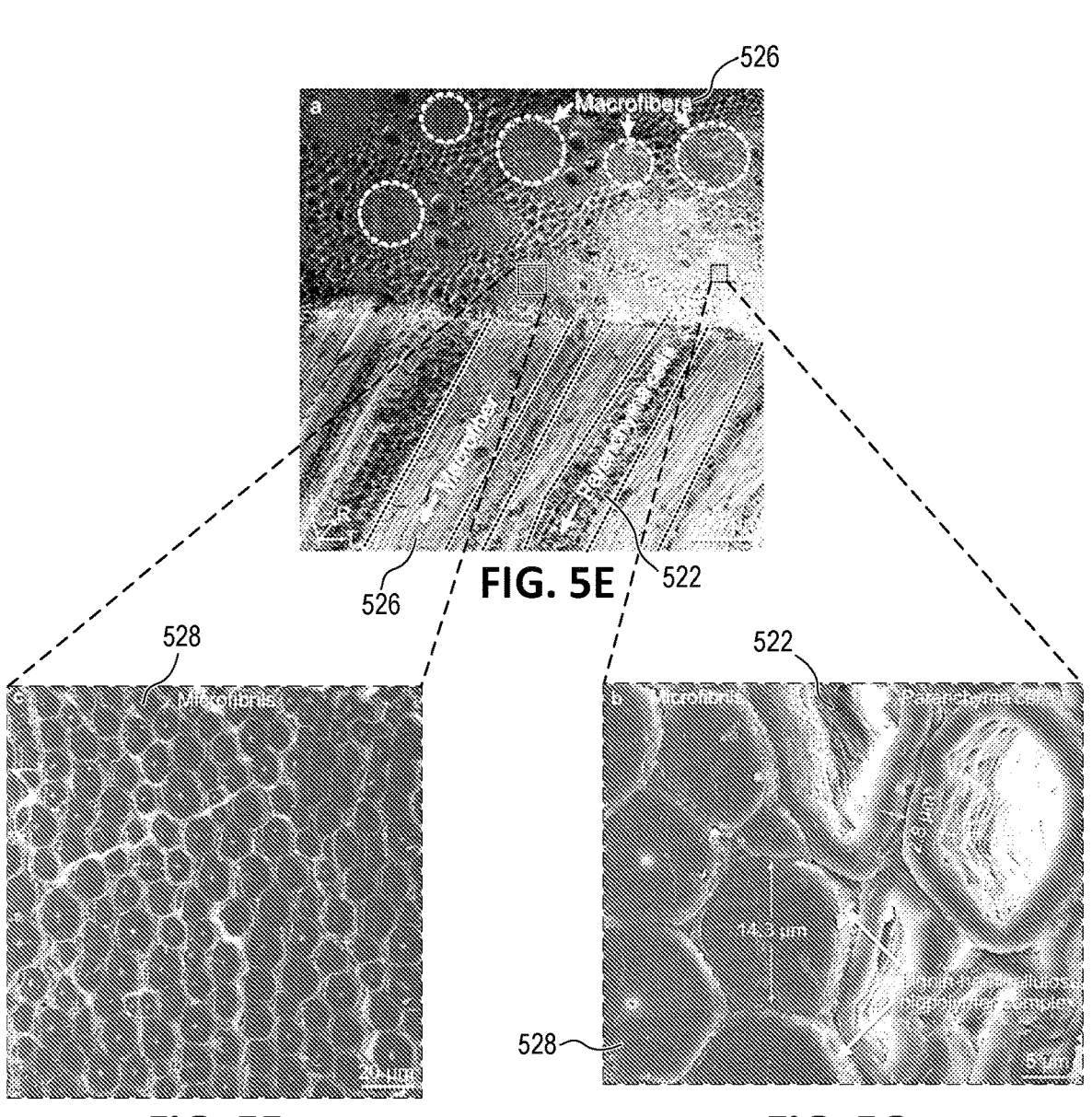
FIG. 5E is an SEM image showing a perspective view of a wall section of a bamboo stem with macrofibers and parenchyma cells therein.
FIGS. 5F-5G are magnified SEM images of portions of the image of FIG. 5E, showing microfibrils forming a macrofiber and the region between microfibrils and parenchymal cells, respectively.
FIG. 5H is a graph of size distribution of microfibrils in a natural bamboo macrofiber.

Within the culm wall 502, the bamboo exhibits a hierarchical cellular structure with porous cells that provide nutrient transport and dense cells that provide mechanical support. For example, FIGS. 5B-5D show images of a cross-section of a bamboo segment 500, in particular, illustrating the microstructure of parenchyma cells 522, vessels 524, and fiber bundles or macrofibers 526 that constitute the culm wall 502. The macrofibers 526 are highly aligned and extend substantially parallel to the longitudinal direction 528, whereas parenchyma cells 522 can be parallel or perpendicular to the longitudinal direction 528. These macrofibers 526 feature thick cell walls that are assembled from aligned semi-crystalline lignocellulosic microfibrils (e.g., 528 in the detailed view 616 of FIG. 6A). For example, the microfibrils have an average diameter of ~12 μm and an aspect ratio of 150~200. These microfibrils are composed of densely packed cellulose nanofibrils (e.g., 530 in the detailed view 616 of FIG. 6A). The cellulose nanofibrils, which have repeating cellulose polymer chains 532 that are arranged in alternating amorphous and highly-ordered (e.g., crystalline) regions, form the basic architectural element of the bamboo cellulose macrofibers 526.

During the growth of bamboo, a large amount of lignin is biosynthesized and deposited at the cell corner regions between the solid macrofibers 526 and porous parenchyma cells 522, forming a tightly-bonded interface via numerous covalent and hydrogen bonds. The rigid macrofibers 526 (e.g., having an elastic modulus of ~25.6 GPa) of bamboo are thus embedded within a matrix of hollow parenchyma cells 522 (e.g., elastic modulus of ~3.7 GPa), and the macrofibers 526 and cells 522 are adhered together via the natural polymer matrix composed of lignin and hemicellulose. This structure makes it difficult to physically isolate the macrofibers from the bamboo without otherwise damaging them and creating significant defects. Such damage/defects results in a relatively low tensile strength, for example, ~300 MPa.

Figures 6A, 6B, 6C, 6D, 6E:
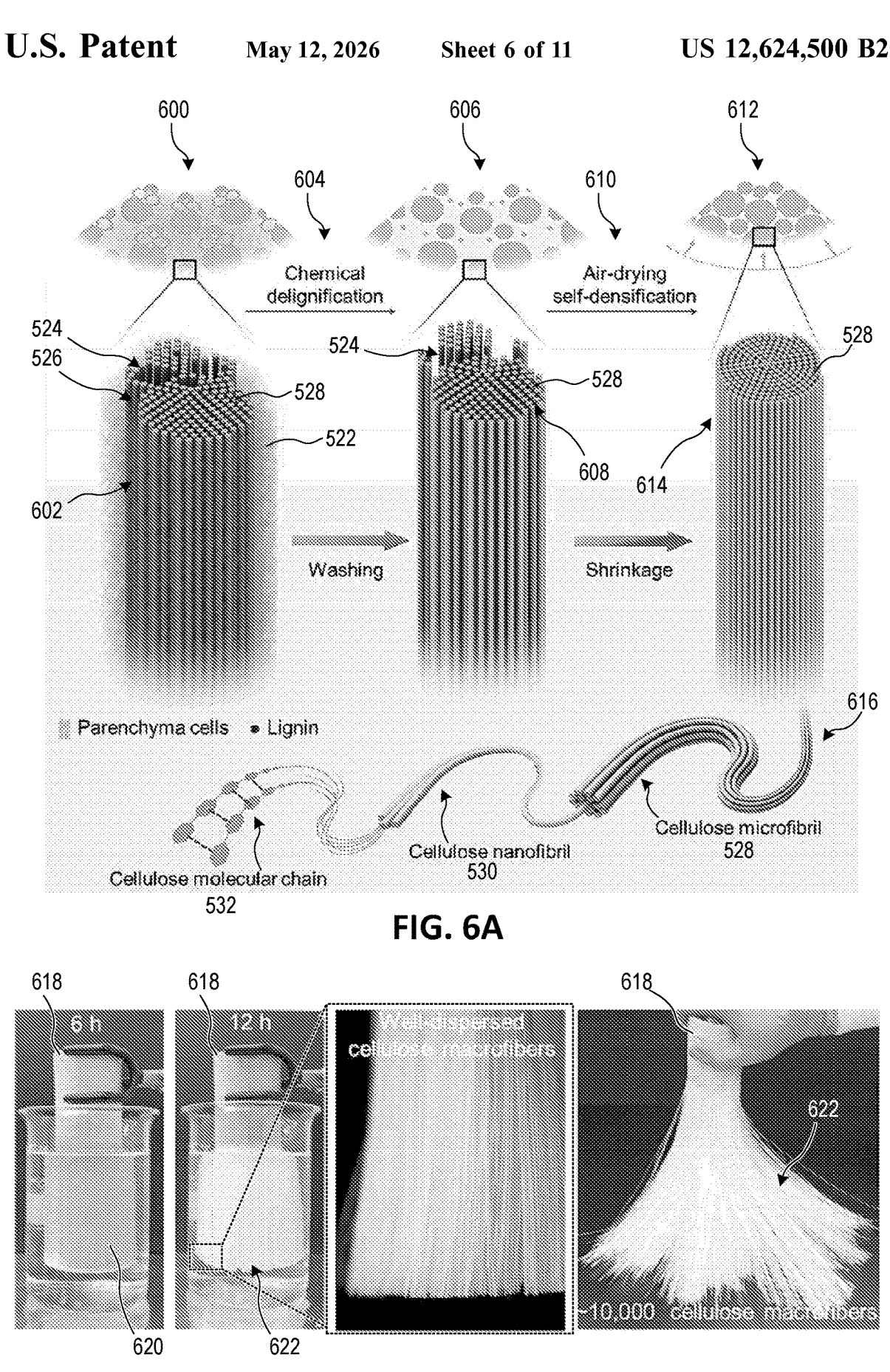
FIG. 6A is a simplified schematic diagram illustrating composition of a section natural bamboo and extraction of intact macrofibers therefrom via delignification, according to one or more embodiments of the disclosed subject matter.
FIG. 6B-6C are photographs showing a natural bamboo step after 6 hours and after 12 hours, respectively of a chemical treatment for delignification, according to one or more embodiments of the disclosed subject matter.
FIGS. 6D-6E are images of cellulose-based macroscale fibers separated after the delignification process, according to one or more embodiments of the disclosed subject matter.

FIG. 6A illustrates extraction of intact bamboo macrofibers via delignification. Prior to delignification, natural bamboo 600 exhibits a cellular hierarchy of macro-scale vessels 524, meso-scale parenchyma cells, and micro-scale microfibrils 528 within macro-scale fiber bundle 526. The lignin-hemicellulose matrix 602 joining the microfibrils 528 to the parenchyma cells can be dissolved or disintegrated by delignification 604, thereby releasing intact cellulose macrofibers 526. In the extraction process, peroxyformic acid is used as a mild delignification treatment that selectively breaks down the lignin/hemicellulose binder 602 as well as the thin-walled parenchyma cells, allowing the nearly-solid cellulosic macrofibers to be separated with little mechanical damage. However, as noted above, other chemicals can be used to perform delignification. In particular, during the delignification, peroxyformic acid selectively reacts with and dissolves the hydrophobic lignin, causing the parenchyma cells to break down and naturally detach from the cellulose macrofibers 608 (e.g., after briefly washing the treated bamboo stem in water). After treatment, the native structure of the delignified cellulose macrofibers 608 is well preserved, as shown at 606, while the selectively delignified parenchyma cells are removed in a subsequent washing step, enabling the rapid isolation of thousands of high-strength cellulose macrofibers 608 from a single bamboo stem.

After delignification, the extracted delignified macrofibers can be air-dried 610, whereby the capillary forces resulting from evaporation of water collapses the constituent cellulose microfibrils 528, and nanofibrils thereof, together. This collapse leads to a dense cellulose macrofiber structure with shrunken dimensions. For example, by simple air drying, denser macrofibers can be extracted with fewer structural defects, as well as increased crystallinity (from ~42% to ~65%) and nanofibril alignment index (from 0.91 to 0.93). The resulting macrofibers exhibit a tensile strength of up to 2.2 GPa and Young's modulus of up to 120 GPa. The crystallinity and orientation of the cellulose nanofibrils within the macrofibers contributes to the longitudinal stiffness and strength of the macrofibers.

In a fabricated example, a bamboo stem with dimensions of 17 cm in height, 5.8 cm in diameter, and a wall thickness of 0.9 cm was soaked in peroxyformic acid solution and heated at a mild temperature of 50° C. for 12 hours. A portion 618 of the bamboo stem was retained outside the peroxyformic acid solution to serve as support for the portion 620 of the stem immersed within the solution, as shown in FIG. 6B. The solution diffused quickly throughout the material via the bamboo lumens and pits, allowing the hydroxyl (HO•) and superoxide anion ($O_2$•⁻) radicals generated from the peroxyformic acid to attack the electron-rich aromatic rings and olefinic side-chain structures of lignin, leading to side-chain oxidation, ring cleavage, and degradation of the lignin and hydrolysis of hemicellulose into to monosaccharides. Over the course of the chemical delignification treatment, the natural yellow color of the bamboo stem gradually diminishes and eventually turns completely white (as shown in FIG. 6C), indicating most of the colored lignin and hemicellulose has been removed from the cell walls. After the delignification process, the bamboo stem was transferred to 0.5 wt % sodium hydroxide solution to remove residual lignin and hemicellulose components, followed by washing with deionized water several times to rinse out any remaining chemicals from the treated bamboo. After treatment and washing, the delignified bamboo stem 622 visibly separated into thousands of distinct macroscale fibers as shown in FIGS. 6D-6E.

Scanning electron microscopy (SEM) was used to study the microstructural change of the bamboo stem during the chemical delignification process. In natural bamboo 600, the solid macrofibers 526 featuring thick walls are embedded in a matrix of hollow honeycomb-like parenchyma cells 522 with thin walls, as shown in FIGS. 6F-6G. However, after 10 hours of delignification treatment, the parenchyma cells 522 gradually begin to separate from the macrofibers 526, as shown in FIG. 6H, whereas the ordered structure of the aligned microfibrils in the macrofibers 526 remains preserved, as shown in FIG. 6I. After treatment, the rigid macrofibers 526 remain intact and aligned along the longitudinal fiber axis, while the parenchyma cells 522 are significantly removed as a result of the loss of the connective lignin matrix. In particular, the high selectivity and efficiency of the hydroxyl (HO•) and superoxide anion ($O_2$•⁻) radicals break the parenchyma cells 522 and adhesive binder into water-soluble lignin and hemicellulose molecular fragments, which are easily removed by washing. In contrast the macrofibers 526 better retain their natural structure due to their low lignin content. Accordingly, the parenchyma cells 522 can be easily removed while causing minimal damage to the macrofibers 526.

After completion of the delignification process, subsequent air-drying of the isolated macrofibers creates a capillary tension that causes the constituent cellulose nanofibrils to collapse together. As a result, the cellulose macrofiber 614 exhibits a ~10-12% volume shrinkage in the cross-section of the cellulose macrofibers, thereby forming a denser structure that can promote a higher number of hydrogen bonds and greater Van der Waals interactions. It should also be noted that the delignified cellulose macrofibers maintained their highly ordered structure after drying, in which the closely packed cellulose nanofibrils are aligned along the longitudinal direction without obvious defects or detachment. Additionally, by tuning the reaction conditions, multiple bamboo stems can be simultaneously processed to isolate cellulose macrofibers of desired length for various applications.

In another fabricated example, a five-year-old bamboo (*Phyllostachys bambusoides*) stem with dimensions of 17 cm in height, 5.8 cm in diameter, and a wall thickness of 0.9 cm was subject to delignification. The raw bamboo culm was cut into individual stems of different lengths (without nodes) and boiled in water for 1 hour to remove water-soluble organic matter and any trapped air. Then the bamboo stems were delignified using a 10 v/v % peroxyformic acid solution (synthesized from a mixture of 30% hydrogen peroxide and formic acid at a mole-to-mole ratio of 1:1, and with 1 wt % sulfuric acid added as a catalyst). The soaking of the bamboo stem in peroxyformic acid was at 50° C. for 12 hours, after which the bamboo stem was neutralized with 0.5 wt % sodium hydroxide solution for 5-10 minutes. The bamboo stem was subsequently washed in DI water several times to remove the chemicals, as well as to detach the parenchymal cells from the cellulose macrofibers. The treated bamboo was then dried at room temperature for 24-48 hour until the moisture content was below 5 wt %.

Under polarized light, the resulting delignified cellulose macrofibers extracted from the bamboo shows bright birefringence, as shown in FIG. 7A-7B, which indicates the uniform removal of the amorphous hemicellulose and lignin as well as the alignment and crystallinity of the cellulose microfibrils. This suggests the cellulose molecular chains that make up these macrofibers are also well ordered. For comparison, lignocellulosic macrofibers were separated from bamboo stems using a mechanical extraction approach (i.e., with no delignification treatment applied). Unlike the chemically-isolated macrofibers, the mechanically-extracted macrofibers displayed a dark-colored surface under polarized light due to the presence of amorphous lignin and hemicellulose, as shown in FIGS. 7C-7D. The delignified cellulose macrofibers are also denser compared to the mechanically-extracted macrofibers, e.g., 1.45 g/cm$^3$ for the delignified macrofibers as compared to 1.12 g/cm$^3$ for the mechanically-extracted macrofibers and 0.75 g/cm$^3$ for natural bamboo stem. The delignified cellulose macrofibers also feature decreased lamellar spacing (e.g., 2.02 Å vs. 2.08 Å for the mechanically-extracted macrofibers) between the cellulose crystalline layers. Such changes can lead to enhanced interactions (e.g., hydrogen bonding, van der Waals forces) between the cellulose fibrils and molecular chains of the bamboo cellulose macrofibers and are likely caused by the removal of the amorphous lignin and hemicellulose as well as the evaporation-driven shrinkage during the air-drying process.

To compare the alignment of the cellulose nanofibrils in both macrofiber samples, their orientation index ($f_c$) was calculated using the diffraction intensity along the equatorial direction of the (200) crystal reflection in the 2D-WAXS patterns. The index of alignment ranges from 0 to 1, with unity corresponding to perfect alignment. The delignified cellulose macrofibers demonstrated an increased nanofibril orientation index of 0.93, compared to 0.91 of the mechanically-extracted macrofibers. This indicates improved alignment of the cellulose Iβ crystalline nanostructures after the delignification and drying process. The improvement in alignment may be due to the substantial reduction of amorphous lignin and hemicellulose, as well as the self-alignment of the highly crystalline cellulose nanofibrils that occurs during the slow drying step that results in considerable shrinkage in volume (~12%) of the bamboo cellulose macrofibers.

The crystallization index of the materials was also calculated based on the ratio of the integrated fitted intensity of the amorphous and crystalline cellulose in the 2D-WAXS results. The delignified cellulose macrofibers exhibited a higher crystallization index (64.9%) as compared to that of the mechanically-extracted macrofibers (42.4%). The molecular alignment of the cellulose chains that make up the nanofibrils was characterized using small-angle X-ray scattering (SAXS). Compared with the mechanically-extracted macrofibers, which display a rhombus-shaped pattern with streaks perpendicular to both the equatorial and meridional streaks, the SAXS analysis of the delignified cellulose macrofibers showed a stronger equatorial streak scattering pattern, indicating the well-aligned crystalline cellulose along and throughout the fiber axis. Such a densely-packed, highly-aligned and high-crystallinity cellulose structure can enable high-strength macrofibers.

The tensile mechanical properties of delignified cellulose macrofibers were characterized according to the ASTM D3379-75 Standard Test Method. Tensile testing of 20 delignified cellulose macrofibers with 2-cm gauge length showed similar stress-strain curves, demonstrating the material's consistency. The stress-strain behavior under loading was approximately linear elastic before reaching the fracture stress, with an average tensile strength of 1.90±0.32 GPa and Young's modulus of 91.3±29.7 GPa, as shown in FIGS. 8A-8B. As shown in FIG. 8B, such values for tensile strength and Young's modulus were 7.2-times and 6.2-times higher, respectively, than that of the natural bamboo stem raw material. Additionally, the delignified cellulose macrofibers have a higher tensile strain of 2.67% (~2-times higher than the natural bamboo stem). As shown in FIG. 8C, when combined with the high tensile strength, this leads to a high work of fracture of 29.9 MJ m$^{-3}$, which is 3-times to 12-times higher than that of the bamboo stem and mechanically-extracted macrofibers. Taking the cross-sectional area or length into consideration, the ultimate tensile strength of delignified cellulose macrofibers of different diameters ranged from 1.48 GPa to 2.22 GPa, as shown in FIG. 8D, whereas the Young's modulus ranged from 60 GPa to 120 GPa. Delignified cellulose macrofibers with smaller diameters and shorter length tended to have a higher strength as compared to those of larger diameters.

The mechanically-extracted macrofiber control showed significantly worse mechanical properties, with a tensile strength of 560±200 MPa and Young's modulus of 49.3±5.6 GPa, as shown in FIGS. 8A-8B. One of the factors that could lead to inferior mechanical properties may be internal damage (e.g., microcracking of the fibrils) created during mechanical defibrillation. In addition, since crystalline cellulose has a much higher Young's modulus (e.g., 110-220 GPa) than amorphous lignin and hemicellulose (e.g., 6 GPa and 8 GPa), the different compositional structure of the mechanically-extracted macrofiber also contributes to its inferior mechanical properties as compared to the delignified cellulose macrofiber.

The good alignment of the cellulose nanofibrils in the bamboo cellulose macrofibers can also be observed from the fracture surfaces after tensile testing, confirming the strengthening mechanism through the enhanced bonding interface via the densely laminated cellulose nanofibrils. In contrast, the nanofibrils in the control mechanically-extracted macrofibers remain covered with lignin and hemicellulose, which would interfere with the interfacial bonding between the constituent nanofibrils. Hence, the dense delignified cellulose macrofibers, which are composed of compact and highly aligned cellulose nanofibrils with high crystallinity of ~65% and small microfibril angle of 7.2°, exhibit far superior mechanical properties than the mechanically-extracted macrofibers, which have a low crystallinity of ~42% and larger microfibril angle of 9.3°.

In another fabricated example, a natural bamboo culm with a length of 170 mm, diameter of 60 mm, and cell wall depth of 8 mm was immersed in a boiling solution of NaOH (10 wt %) and $Na_2SO_3$ (5 wt %) at 70° C. for 4 hours to partially (but not fully) remove lignin and hemicellulose. Subsequently, the chemically-treated bamboo culm was washed with DI water to remove chemicals and other impurities. Then the partially-delignified bamboo culm was subjected to a solution of hydrogen peroxide (10 wt %) and acetic acid (10 wt %) at 60° C. for 4 hours. Finally, the delignified bamboo fiber was isolated from parenchymatous cells by agitation in solution and subsequent drying in air.

Composite Materials Formed With Extracted Bamboo Fibers

Delignified-bamboo-fiber-reinforced polymer composites with improved mechanical properties were fabricated by a combination of chemical treatment and mechanical pressing. For example, a 48-month-old bamboo culm with internode length of 30 cm was immersed in a boiling solution containing sodium sulfite NaOH (2.5 mol $L^{-1}$) and $Na_2SO_3$ (0.4 mol $L^{-1}$) for 6 hours to partially dissolve the lignin and hemicellulose. Then, the partially delignified bamboo culm was immersed in the DI water to remove any remnants of chemicals. Subsequently, the partially-delignified bamboo culm was immersed in a solution of hydrogen peroxide and acetic acid for 2 hours to further remove lignin and hemicellulose. Finally, the delignified bamboo fibers were immersed in a PLA solution under vacuum. The composites were fabricated by compression molding technology with assembled delignified bamboo fibers along the grain direction in the hot-pressing mold at 50° C. under a pressure of 5.0 MPa for 24 hours.

In another fabricated example, a 48-month-old bamboo culm with internode length of 30 cm was immersed in a boiling solution containing NaOH (2.5 mol $L^{-1}$) and $Na_2SO_3$ (0.4 mol $L^{-1}$) for 6 hours to partially dissolve the lignin and hemicellulose. Then, the partially delignified bamboo culm was immersed in the DI water to remove any remnants of chemicals. Subsequently, the partially-delignified bamboo culm was immersed in a solution of hydrogen peroxide and acetic acid for 2 hours to further remove lignin and hemicellulose. Finally, the delignified bamboo was immersed in an inorganic matrix composed of ordinary Portland cement under vacuum. The contents of white bamboo fibers for reinforcement were 6% by mass in relation to the total dry mass content, which corresponds to approximately 12% by volume, respectively. The cement-based composites were molded in 160×40 mm² plate, to have a specimen thickness of about 8 mm. Then the specimens were pressed at 3.2 MPa for 5 minutes, and wet samples were sealed in a plastic bag to cure at room temperature for one day and further cured at (20±1)° C., and relative humidity exceeding 90% until test age.

Figure 9A:
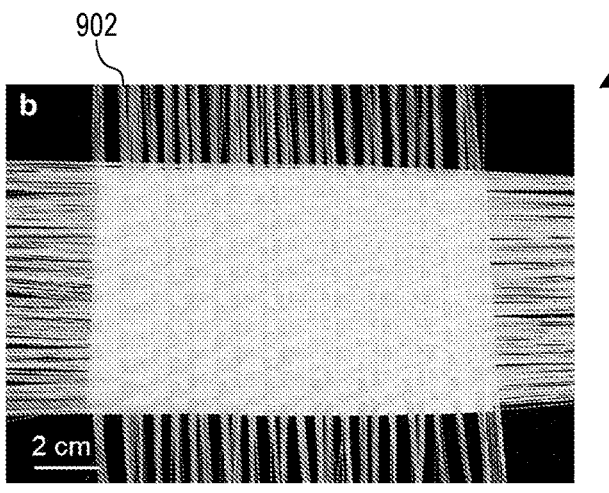
FIG. 9A is an image of a fabricated fabric mat formed from cellulose-based macrofibers extracted from bamboo, according to one or more embodiments of the disclosed subject matter.
Figure 9B:
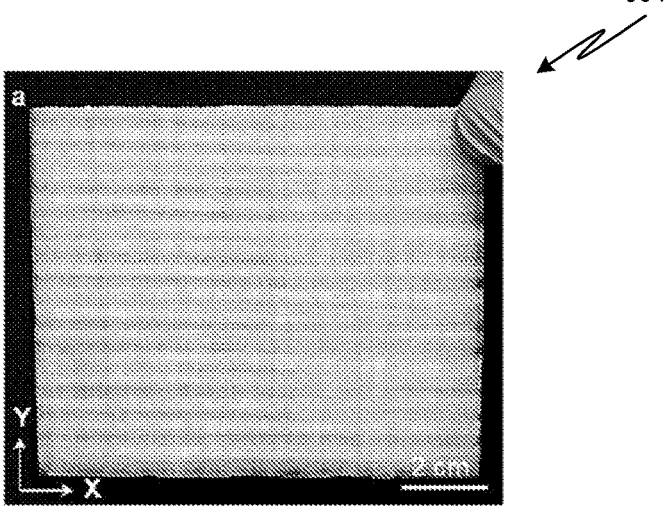
FIG. 9B is an image of a fabricated composite formed by encasing the fabric mat of FIG. 9A in an epoxy resin, according to one or more embodiments of the disclosed subject matter.
Figure 9C:
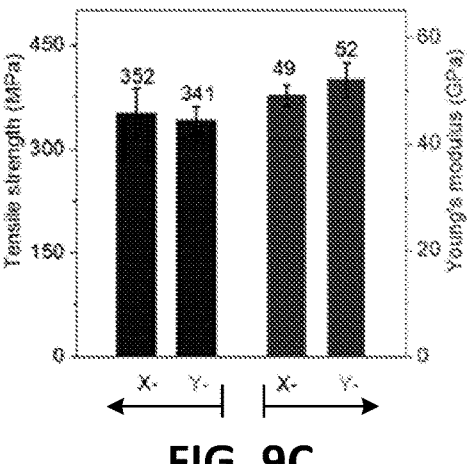
FIG. 9C is a graph comparing tensile strength and Young's modulus for the fabricated composite of FIG. 9B.

In another fabricated example, delignified cellulose macrofibers were used to fabricate bamboo-fiber-reinforced polymer composites (BFRCs). For example, ~1000 delignified cellulose macrofibers 902 were woven into a twill fabric mat 900 as shown in FIG. 9A. In the fabric mat, the macrofibers were interlaced in orthogonal directions in an aligned structure without intertwining. The fabric mat was then impregnated with epoxy resin by vacuum-assisted resin transfer molding (e.g., using setup and process described above with respect to FIG. 4B). The delignified cellulose macrofibers have a high surface energy for epoxy resin, which enables a high interfacial bonding strength. For example, when a micro-drop of the epoxy resin was directly applied on a single cellulose macrofiber, a contact angle of ~38° was observed, indicating the good wettability of the resin. The wettability can be attributed to the numerous hydroxyl groups exposed on the surface of the delignified cellulose macrofibers. After the resin infusion process, the composites were further compressed and thermally cured. For example, FIG. 9B shows a BFRC product 904 composed of two sheets of orthogonally woven (0/90) bamboo cellulose macrofibers impregnated within the cured resin. The tensile strength of the BFRC 904 was ~350±28 MPa along both the horizontal and vertical (X and Y) directions, as shown in FIG. 9C.

Extracted Grass Fibers

Natural grass features a heterogeneous structure 1004 composed of hollow vessels 1008 and parenchymal cells 1006, as well as fibers 1010 extending along the longitudinal growth direction, as shown in FIGS. 10C-10D. In this structure, the porous vessels 1008 and parenchymal cells 1006 are mainly responsible for transporting water and nutriments, while the cellulosic fibers 1010 primarily provide structural support. Within the plant, these components are glued together by the lignin and hemicellulose into an integrated structure. While essential to the living plant, the porous vessels and parenchymal cells function as defects when used as a structural material, thereby diminishing the mechanical properties of natural grass. Accordingly, the fibers 1010 can be chemically-extracted from the natural grass for use as a separate structural material.

In a fabricated example, gladiolus leaves 1000 (FIG. 10A) were soaked in water overnight, after which the wet leaves were subject to delignification by immersing in a boiling solution of NaOH and $Na_2SO_3$ for 30 minutes. After washing with DI water and drying, the macroscale fibers 1002 can be harvested, as shown in FIG. 10B.

In another fabricated example, gladiolus leaves having a length of 100 cm were used. The long gladiolus leaves were immersed in a boiling solution containing NaOH (10 wt %) and $Na_2SO_3$ (5 wt %) at 70° C. for 0.5 hours to partially (but not fully) remove lignin and hemicellulose. Subsequently, the chemically-treated gladiolus leaves were washed with DI water in order to remove chemicals and other impurities. Then, the partially-delignified gladiolus leaves were immersed in a solution of hydrogen peroxide (5 wt %) and acetic acid (2 wt %) solution at 50° C. for 1 hour. The chemical treatments can be effective to reduce the content of lignin and hemicellulose within the macrofiber, for example, from 19 wt % and 23 wt %, respectively, in the natural gladiolus leaves to 2.3 wt % and 5.5 wt %, respectively, in the delignified macrofiber. The content of cellulose may also increase, for example, from 45 wt % in the natural gladiolus leaf to 85 wt % in the delignified macrofiber.

After delignification, the resulting gladiolus macrofibers were dried in oven at 50° C. The resulting lignocellulosic macrofibers were as long as ~1 m with a dense structure composed of regularly stacked and compactly bonded cellulosic microfibrils. At a finer scale, numerous aligned nanofibrils parallel to the fiber axis orientation constitute the microfibril. The obtained lignocellulosic fibers from the grass can have superior mechanical properties, for example, a tensile strength up to 1170 MPa, which is much higher than the original grass of 60 MPa. Due to the removal of hollow vessels and parenchymal cells, as well as the amorphous hemicellulose and lignin, the resulting lignocellulosic fibers exhibits a high density of 1.31 g cm$^{-3}$ (e.g., 3.7 times greater than that of natural grass). Small angle X-ray scattering (SAXS) analysis further indicates the highly ordered alignment of the cellulosic microfibrils in the lignocellulosic macrofibers. Moreover, the lignocellulosic macrofiber 1012 features smooth surface, as shown in FIG. 10E, and a dense structure (e) due to removing of the hollow vessels 1008 and parenchymal cells 1006.

Figure 12:
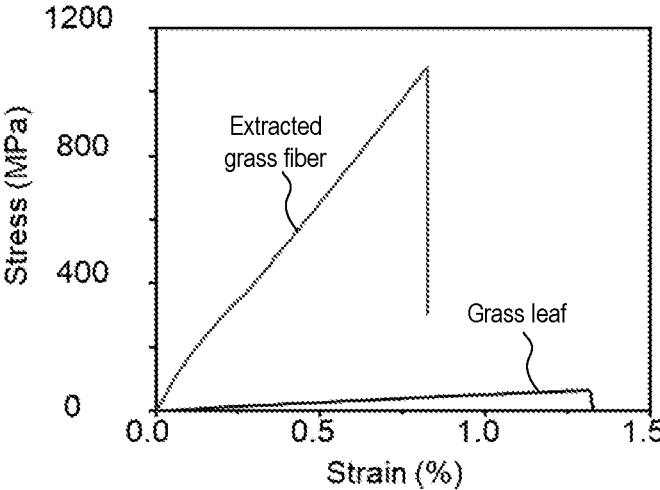
FIG. 12 is a graph comparing stress-strain curves for lignocellulose-based macrofibers extracted from grass according to embodiments of the disclosed subject matter and natural grass leaf.

The mechanical properties of the lignocellulosic macrofibers extracted from the natural grass were investigated by tensile test. As shown in FIG. 12, the lignocellulosic macrofibers exhibit a higher maximum force with a similar elongation at break compared to the natural grass. The lignocellulosic macrofibers exhibited a tensile strength of 1.07 GPa and Young's modulus of 89.8 GPa, which are 16-times and 18-times higher, respectively, than that of the original natural grass. The lignocellulosic macrofibers also demonstrate a specific strength greater than 0.75 GPa cm$^3$/g and a specific modulus greater than 60 GPa cm$^3$/g. In addition, the lignocellulosic macrofibers were able to demonstrate a wet strength of 0.51 GPa.

The aligned microstructure of the lignocellulosic macrofibers can contribute to the enhanced mechanical properties. In particular, the cellulose fibrils compactly stack and interlock with each other on both the micro-scale and the nano-scale, which can reinforce the interfacial bonding (e.g., Van der Waals force and hydrogen bonds) between them. Once loaded with an external force, all the fibrils together sustain the tensile stress, which can also give rise to a uniform fracture of the smart cellulosic fiber structure. Moreover, the dense and unidirectional fibrils can effectively transfer and decentralize the stress, thus achieving superstrong mechanical performance of the lignocellulosic fibers.

Figures 11A, 11B, 11C:
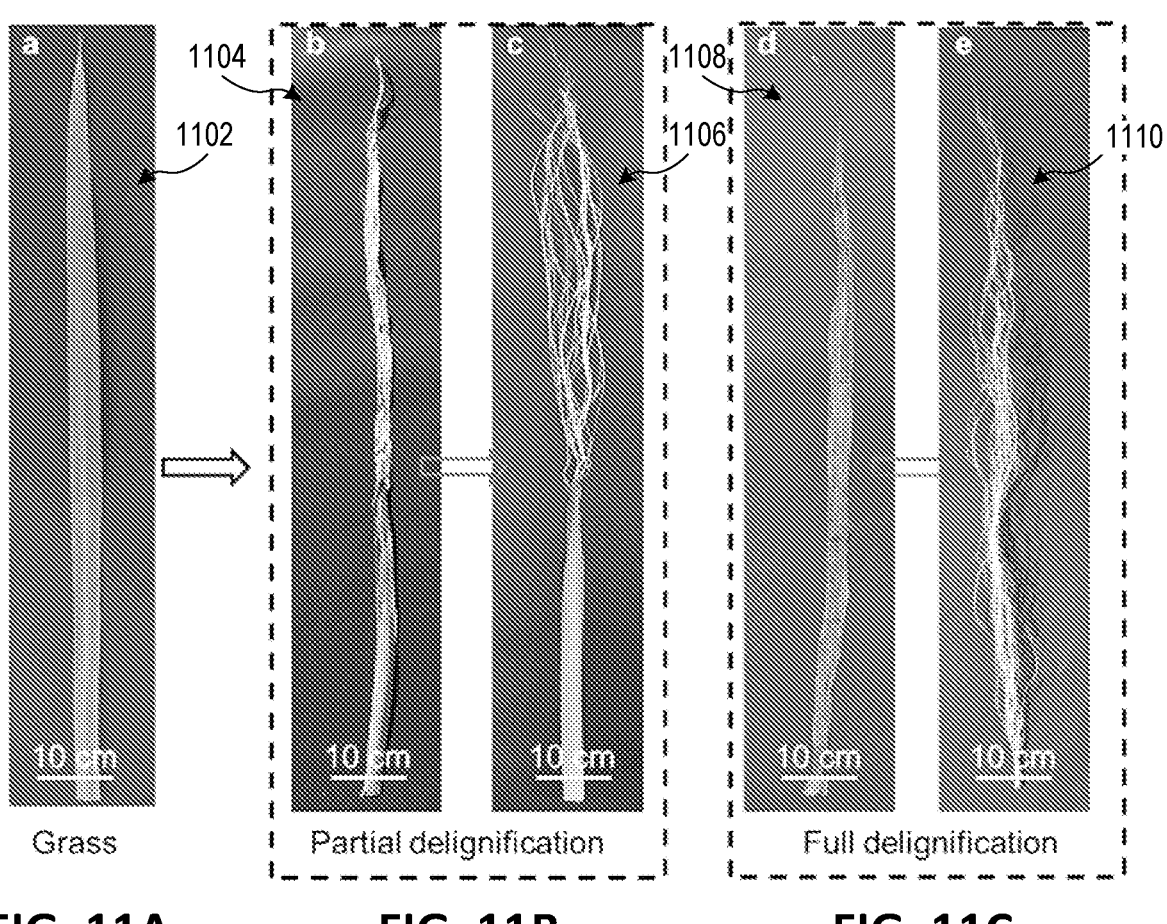
FIG. 11A is an image of natural grass prior to delignification.
FIG. 11B shows images of the natural grass of FIG. 11A after a first step of partial-delignification (left) and a second step of chemical removal (right), according to one or more embodiments of the disclosed subject matter.
FIG. 11C shows images of the natural grass of FIG. 11A after a first step of full-delignification (left) and a second step of chemical removal (right), according to one or more embodiments of the disclosed subject matter.

In another fabricated example, a piece of natural grass leaf 1102 (FIG. 11A) having a length of 100 cm was subjected to different delignification conditions. In FIG. 11B, the grass leaf 1102 has been only partially delignified, with 1104 indicating the leaf after partial delignification but prior to rinsing, and 1106 indicating the leaf after partial delignification and after rinsing. In FIG. 11C, the grass leaf 1102 has been completely delignified (e.g., ≥90% lignin removal), with 1108 indicating the leaf after complete delignification but prior to rinsing, and 1110 indicating the leaf after complete delignification and after rinsing.

Composite Materials Formed With Extracted Grass Fibers

As discussed above, the lignocellulosic macrofibers extracted from grass can exhibit relatively strong mechanical properties, which be helpful in manufacturing strong composites. In a fabricated example, lignocellulosic grass fibers were used as reinforcement for preparing high-performance polymer composite. In particular, 10 cm grass was immersed in a boiling solution containing NaOH (2 mol L$^{-1}$) and Na$_2$SO$_3$ (0.3 mol L$^{-1}$) for 4 hours to partially dissolve the lignin and hemicellulose therein. Then, the partially-delignified grass was immersed in water to remove any remnants of chemicals. Subsequently, the partially-delignified grass was immersed in a solution of hydrogen peroxide and acetic acid for 1 hour to further remove lignin and hemicellulose. Finally, the resulting macrofibers were coated with an organic polymer to form a composite. The content of macrofibers within the composite was 10%. The macrofiber-reinforced polymer composites were molded in 100×100 mm$^2$ plates, with a specimen thickness of about 5 mm. The specimens were then pressed at 2 MPa for 5 min, and wet samples were sealed in a plastic bag to cure at room temperature.

In another fabricated example, 15 cm grass was immersed in a boiling solution containing NaOH (2.5 mol L$^{-1}$) and Na$_2$SO$_3$ (0.35 mol L$^{-1}$) for 3 hours to partially dissolve the lignin and hemicellulose therein. Then, the partially delignified grass was immersed in water to remove any remnants of chemicals. Subsequently, the partially-delignified grass was immersed in a solution of hydrogen peroxide and acetic acid for 2 hours to further remove lignin and hemicellulose. Finally the resulting macrofibers were coated with an organic polymer. The contents of macrofibers within the composite was 8%. The macrofiber-reinforced polymer composites were molded in 100×100 mm$^2$ plates, with a specimen thickness of about 7 mm. The specimens were then pressed at 2.5 MPa for 10 min, and cured at room temperature.

Functionalized Extracted Fibers

Delignified cellulose macrofibers were modified by dipcoating polypyrrole solution 10 times with a speed of 3 mm/min. The polypyrrole dip-coated macrofibers were dried at 80° C. for 6 hours, resulting in conductive functional macrofibers.

In another example, delignified cellulose macrofibers were soaked in a ZnO precursor solution for 5 hours. After the end of treatment, the macrofibers were slowly taken out from the solution and allowed to rest at room temperature for 30 minutes. The resultant macrofibers were then dried at 80° C. for 6 hours and then slowly cooled. Finally, the ZnO particles were grown on the surface of macrofibers, resulting in ZnO-coated macrofibers having a light-catalytic function.

Additional Examples of the Disclosed Technology

In view of the above described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1.

An engineered plant material comprising one or more substantially-delignified, cellulose-based fibers chemically-extracted intact from a matrix of lignin and hemicellulose in a piece of natural plant material.

Clause 2.

A composite material comprising:

a plurality of substantially-delignified, cellulose-based fibers, each cellulose-based fiber being chemically-extracted intact from a matrix of lignin and hemicellulose in a respective piece of natural plant material; and a polymer infiltrating each cellulose-based fiber.

Clause 3.

A composite material comprising:

a structural matrix; and a plurality of substantially-delignified, cellulose-based fibers disposed within the structural matrix, each cellulose-based fiber being chemically-extracted intact from a matrix of lignin and hemicellulose in a respective piece of natural plant material.

Clause 4.

The material of any clause or example herein, in particular Clause 3, wherein the structural matrix comprises a polymer or concrete.

Clause 5.

The material of any clause or example herein, in particular any one of Clauses 2 and 4, wherein the polymer comprises epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly(m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PBSA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, carboxymethyl cellulose, cellulose acetate, starch, agar, alginic acid, or any combination of the foregoing.

Clause 6.

The material of any clause or example herein, in particular any one of Clauses 4-5, wherein the concrete comprises Portland cement, agro-concrete, magnesium carbonate $(MgCO_3)$, magnesium hydroxide $(Mg(OH)_2)$, or any combination of the foregoing.

Clause 7.

The material of any clause or example herein, in particular any one of Clauses 2-6, wherein a content of the plurality of the cellulose-based fibers within the composite material is at least 0.1 wt %.

Clause 8.

The material of any clause or example herein, in particular any one of Clauses 1-7, wherein the natural plant material is a species in the Poales order.

Clause 9.

The material of any clause or example herein, in particular any one of Clauses 1-8, wherein the natural plant material is a species in the Poaceae family.

Clause 10.

The material of any clause or example herein, in particular any one of Clauses 1-9, wherein the natural plant material is a natural grass.

Clause 11.

The material of any clause or example herein, in particular any one of Clauses 1-10, wherein the natural plant material comprises bamboo, reed, sugarcane, maize, wheat, rice, jute, hemp, kenaf, ramie, banana, corn, wheat, rice, roselle, rattan, sorghum, sisal, palm, henequen, manila, pineapple, curaua, yucca, cabuya, screw pine, abaca, gladiolus, or agave.

Clause 12.

The material of any clause or example herein, in particular any one of Clauses 1-11, wherein each cellulose-based fiber has a length of at least 5 cm and/or a maximum cross-sectional dimension in a plane perpendicular to a direction of the length of at least 5 μm.

Clause 13.

The material of any clause or example herein, in particular any one of Clauses 1-12, wherein the length of each cellulose-based fiber is between 5 cm and 200 cm, inclusive.

Clause 14.

The material of any clause or example herein, in particular any one of Clauses 1-13, wherein the maximum cross-sectional dimension (also referred to herein as diameter) of each cellulose-based fiber is between 5 μm and 1 mm, inclusive.

Clause 15.

The material of any clause or example herein, in particular any one of Clauses 1-14, wherein the maximum cross-sectional dimension of each cellulose-based fiber is at least 100 μm.

Clause 16.

The material of any clause or example herein, in particular any one of Clauses 1-15, wherein each cellulose-based fiber has a specific strength of at least 0.5 $GPa \cdot cm^3/g$ (e.g., ≥1 $GPa \cdot cm^3/g$), a crystallinity of at least 40% (e.g., ≥50%), a tensile strength of at least 0.5 GPa (e.g., ≥1 GPa), a Young's modulus of at least 20 GPa (e.g., ≥30 GPa, or ≥60 GPa), a density of at least 0.8 $g/cm^3$ (e.g., ≥1 $g/cm^3$), or any combination the foregoing.

Clause 17.

The material of any clause or example herein, in particular any one of Clauses 1-16, wherein each cellulose-based fiber has a cellulose content of at least 70 wt % (e.g., ≥85 wt %), a hemicellulose content less than or equal to 10 wt % (e.g., ≤6 wt %), a lignin content less than or equal to 10 wt % (e.g., ≤4 wt %), or any combination of the foregoing.

Clause 18.

The material of any clause or example herein, in particular any one of Clauses 1-17, wherein each cellulose-based fiber has a moisture content less than or equal to 10 wt % (e.g., ≤5 wt %).

Clause 19.

The material of any clause or example herein, in particular any one of Clauses 1-18, further comprising, provided on or within each cellulose-base fiber, a conductive additive, a magnetic additive, a piezoelectric material, a stimuli-responsive material, a catalytic material, or any combination of the foregoing.

Clause 20.

A method comprising:

(a) subjecting a piece of natural plant material to one or more chemical treatments so as to remove substantially all lignin therefrom; and (b) after (a), extracting from the chemically-treated piece a plurality of substantially-delignified, cellulose-based fibers separated from each other.

Clause 21.

The method of any clause or example herein, in particular Clause 20, wherein (b) comprises agitating the chemically-treated piece in solution.

Clause 22.

The method of any clause or example herein, in particular any one of Clauses 20-21, wherein at least one of the one or more chemical treatments comprises partial or full immersion in one or more chemical solutions.

Clause 23.

The method of any clause or example herein, in particular any one of Clauses 20-22, wherein the one or more chemical solutions comprise an alkaline solution.

Clause 24.

The method of any clause or example herein, in particular any one of Clauses 22-23, wherein the one or more chemical solutions comprise sodium hydroxide (NaOH), lithium hydroxide (LiOH), potassium hydroxide (KOH), sodium sulfite ($Na_2SO_3$), sodium sulfide ($Na_2S$), $Na_nS$ wherein n is an integer, urea ($CH_4N_2O$), sodium bisulfite ($NaHSO_3$), sulfur dioxide ($SO_2$), anthraquinone ($C_{14}H_8O_2$), methanol ($CH_3OH$), ethanol ($C_2H_5OH$), butanol ($C_4H_9OH$), formic acid ($CH_2O_2$), hydrogen peroxide ($H_2O_2$), acetic acid ($CH_3COOH$), butyric acid ($C_4H_8O_2$), peroxyformic acid ($CH_2O_3$), peroxyacetic acid ($C_2H_4O_3$), ammonia ($NH_3$), tosylic acid (p-TsOH), sodium hypochlorite (NaClO), sodium chlorite ($NaClO_2$), chlorine dioxide ($ClO_2$), chorine ($Cl_2$), or any combination of the foregoing.

Clause 25.

The method of any clause or example herein, in particular any one of Clauses 20-24, wherein after (b) the plurality of cellulose-based fibers remain attached to a base portion of the natural plant material, and the method further comprises severing the cellulose-based fibers from the base portion.

Clause 26.

The method of any clause or example herein, in particular any one of Clauses 20-25, further comprising:

(c) after (b), drying the cellulose-based fibers such that evaporation of water from each cellulose-based fiber causes densification thereof Clause 27.

The method of any clause or example herein, in particular Clause 26, wherein the drying of (c) comprises exposing to an air or gas flow, exposing to a stagnant volume of air or gas, exposing to vacuum, exposing to room temperature, heating to a temperature above room temperature, or any combination thereof.

Clause 28.

The method of any clause or example herein, in particular any one of Clauses 26-27, wherein, after (c), each cellulose-based fiber has a moisture content of 10 wt % or less (e.g., ≤5 wt %).

Clause 29.

The method of any clause or example herein, in particular any one of Clauses 26-28, wherein a volume of each cellulose-based fiber after (c) is at least 10% less than a volume of each cellulose-based fiber before (c).

Clause 30.

The method of any clause or example herein, in particular any one of Clauses 20-29, wherein (a) comprises:

(a1) immersing at least a first portion of the piece of natural plant material within a first solution to remove some of the lignin in the immersed first portion; and (a2) after (a1), immersing at least the first portion within a second solution to remove remaining lignin in the immersed first portion.

Clause 31.

The method of any clause or example herein, in particular Clause 30, wherein, after (a1) and prior to (a2), at least the first portion is washed with water to remove remnants of the first solution.

Clause 32.

The method of any clause or example herein, in particular any one of Clauses 30-31, wherein the first solution comprises peroxyformic acid ($CH_2O_3$).

Clause 33.

The method of any clause or example herein, in particular any one of Clauses 30-32, wherein the second solution comprises sodium hydroxide (NaOH) or potassium hydroxide (KOH).

Clause 34.

The method of any clause or example herein, in particular any one of Clauses 30-31, wherein the first solution comprises a mixture of potassium hydroxide (KOH) and sodium sulfite ($Na_2SO_3$), a mixture of potassium hydroxide (KOH) and sodium sulfide ($Na_2S$), a mixture of sodium hydroxide (NaOH) and sodium sulfite ($Na_2SO_3$), or a mixture of sodium hydroxide (NaOH) and sodium sulfide ($Na_2S$).

Clause 35.

The method of any clause or example herein, in particular any one of Clauses 30-32 and 34, wherein the second solution comprises a mixture of hydrogen peroxide ($H_2O_2$) and acetic acid ($C_2H_4O_2$), or a mixture of hydrogen peroxide ($H_2O_2$) and formic acid ($CH_2O_2$).

Clause 36.

The method of any clause or example herein, in particular any one of Clauses 20-35, further comprising infiltrating a polymer into each cellulose-based fiber to form a composite material.

Clause 37.

The method of any clause or example herein, in particular any one of Clauses 20-36, further comprising embedding each cellulose-based fiber within a structural matrix to form a composite material.

Clause 38.

The method of any clause or example herein, in particular Clause 37, wherein the structural matrix comprises a polymer or concrete.

Clause 39.

The method of any clause or example herein, in particular any one of Clauses 36-38, wherein the polymer comprises epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly(m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PBSA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, carboxymethyl cellulose, cellulose acetate, starch, agar, alginic acid, or any combination of the foregoing.

Clause 40.

The method of any clause or example herein, in particular any one of Clauses 38-39, wherein the concrete comprises Portland cement, agro-concrete, magnesium carbonate ($MgCO_3$), magnesium hydroxide ($Mg(OH)_2$), or any combination of the foregoing.

Clause 41.

The method of any clause or example herein, in particular any one of Clauses 36-40, wherein a content of the plurality of the cellulose-based fibers within the composite material is at least 0.1 wt % (e.g., at least 0.5 wt %).

Clause 42.

The method of any clause or example herein, in particular any one of Clauses 20-41, wherein the natural plant material is a species in the Poales order.

Clause 43.

The method of any clause or example herein, in particular any one of Clauses 20-42, wherein the natural plant material is a species in the Poaceae family.

Clause 44.

The method of any clause or example herein, in particular any one of Clauses 20-43, wherein the natural plant material is a natural grass.

Clause 45.

The method of any clause or example herein, in particular any one of Clauses 20-44, wherein the natural plant material comprises bamboo, reed, sugarcane, maize, wheat, rice, jute, hemp, kenaf, ramie, banana, corn, wheat, rice, roselle, rattan, sorghum, sisal, palm, henequen, manila, pineapple, curaua, yucca, cabuya, screw pine, abaca, gladiolus, or agave.

Clause 46.

The method of any clause or example herein, in particular any one of Clauses 26-45, wherein, after (c), each cellulose-based fiber has a length of at least 5 cm and/or a maximum cross-sectional dimension (e.g., diameter) in a plane perpendicular to a direction of the length of at least 5 μm.

Clause 47.

The method of any clause or example herein, in particular Clause 46, wherein the length of each cellulose-based fiber after (b) is between 5 cm and 200 cm, inclusive.

Clause 48.

The method of any clause or example herein, in particular any one of Clauses 46-47, wherein the maximum cross-sectional dimension (e.g., diameter) of each cellulose-based fiber after (b) is between 5 μm and 1 mm, inclusive.

Clause 49.

The method of any clause or example herein, in particular any one of Clauses 46-48, wherein the maximum cross-sectional dimension of each cellulose-based fiber after (b) is at least 100 μm.

Clause 50.

The method of any clause or example herein, in particular any one of Clauses 26-49, wherein, after (c), each cellulose-based fiber has a specific strength of at least 0.5 GPa·cm$^3$/g (e.g., ≥1 GPa·cm$^3$/g), a crystallinity of at least 40% (e.g., ≥50%), a tensile strength of at least 0.5 GPa (e.g., ≥1 GPa), a Young's modulus of at least 20 GPa (e.g., ≥30 GPa or ≥60 GPa), a density of at least 0.8 g/cm$^3$ (e.g., ≥1 g/cm$^3$), or any combination the foregoing.

Clause 51.

The method of any clause or example herein, in particular any one of Clauses 26-50, wherein, after (c), each cellulose-based fiber has a cellulose content of at least 70 wt % (e.g., ≥85 wt %), a hemicellulose content less than or equal to 10 wt % (e.g., ≤6 wt %), a lignin content less than or equal to 10 wt % (e.g., ≤4 wt %), or any combination of the foregoing.

Clause 52.

The method of any clause or example herein, in particular any one of Clauses 20-51, further comprising providing on or within each cellulose-base fiber a conductive additive, a magnetic additive, a piezoelectric material, a stimuli-responsive material, a catalytic material, or any combination of the foregoing.

Clause 53.

An engineered plant material formed by the method of any clause or example herein, in particular any one of Clauses 20-52.

Clause 54.

A composite material formed by the method of any clause or example herein, in particular any one of Clauses 20-52.

Conclusion

Any of the features illustrated or described with respect to FIGS. 1-12 and Clauses 1-54 can be combined with any other features illustrated or described with respect to FIGS. 1-12 and Clauses 1-54 to provide materials, methods, devices, and embodiments not otherwise illustrated or specifically described herein. All features described herein are independent of one another and, except where structurally impossible, can be used in combination with any other feature described herein.

In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope and spirit of these claims.

The invention claimed is:

1. A composite material comprising:

a structural matrix; and a plurality of delignified, cellulose-based macrofibers disposed within the structural matrix, each cellulose-based macrofiber having been chemically-extracted intact from a matrix of lignin and hemicellulose that joined microfibrils of one or more macrofibers to parenchyma cells in a microstructure of a respective piece of natural bamboo, wherein a content of lignin in each cellulose-based macrofiber is less than or equal to 4 wt %, each cellulose-based macrofiber is separate and distinct from any other cellulose-based macrofiber extracted from the natural bamboo, each cellulose-based macrofiber has a moisture content less than or equal to 10 wt % and exhibits a tensile strength of at least 1 GPa, and each cellulose-based macrofiber has a length of at least 5 cm, a diameter of at least 100 μm, and a density of at least 1 g/cm$^3$.

2. The material of claim 1, wherein the structural matrix comprises a polymer or concrete.

3. The material of claim 1, wherein a content of the plurality of the cellulose-based macrofibers within the composite material is at least 0.1 wt %.

4. The material of claim 1, wherein each cellulose-based macrofiber has a specific strength of at least 0.5 GPa·cm$^3$/g, a crystallinity of at least 40%, a Young's modulus of at least 20 GPa, or any combination of the foregoing.

5. The material of claim 1, wherein each cellulose-based macrofiber has a cellulose content of at least 70 wt % and a hemicellulose content less than or equal to 10 wt %.

6. The material of claim 1, wherein provided on or within each cellulose-based macrofiber is a conductive additive, a magnetic additive, a piezoelectric material, a stimuli-responsive material, a catalytic material, or any combination of the foregoing.

7. The material of claim 2, wherein:

the polymer comprises epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly (m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PBSA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, carboxymethyl cellulose, cellulose acetate, starch, agar, alginic acid, or any combination of the foregoing; or the concrete comprises Portland cement, agro-concrete, magnesium carbonate ($MgCO_3$), magnesium hydroxide ($Mg(OH)_2$), or any combination of the foregoing.

8. The material of claim 1, wherein:

the length of each cellulose-based macrofiber is between 5 cm and 200 cm, inclusive;

each cellulose-based macrofiber has a crystallinity of at least 50%; and each cellulose-based macrofiber has a Young's modulus of at least 60 GPa.

9. The material of claim 1, wherein:

the microstructure of the natural bamboo has lumina formed at least in part by the matrix and the parenchyma cells, and the one or more delignified, cellulose-based macrofibers lack such lumina; and the natural bamboo has an aligned ordered structure for the microfibrils therein, and each cellulose-based macrofiber retains the aligned ordered structure for the microfibrils.

10. The material of claim 1, wherein the density of each cellulose-based macrofiber is about 1.45 g/cm³.

11. A method comprising:

(a) subjecting a piece of natural bamboo to one or more chemical treatments so as to remove lignin therefrom, at least one of the one or more chemical treatments comprising partial or full immersion in one or more chemical solutions, the natural bamboo having a microstructure with a plurality of cellulose-based macrofibers, parenchyma cells, and a matrix of lignin and hemicellulose that joins microfibrils of the cellulose-based macrofibers to the parenchyma cells, the one or more chemical treatments being effective to dissolve the matrix and break down the parenchyma cells such that the cellulose-based macrofibers are released;

(b) after (a), extracting from the chemically-treated piece the plurality of cellulose-based macrofibers as individual, intact cellulose-based macrofibers separate and distinct from each other;

(c) after (b), drying the cellulose-based macrofibers such that evaporation of water from each cellulose-based macrofiber causes self-densification thereof; and (d) after (c), embedding each cellulose-based macrofiber within a structural matrix to form a composite material, wherein, after (c):

a content of lignin in each cellulose-based macrofiber is less than or equal to 4 wt %, each cellulose-based macrofiber has a moisture content less than or equal to 10 wt % and exhibits a tensile strength of at least 1 GPa, and each cellulose-based macrofiber has a length of at least 5 cm, a diameter of at least 100 μm, and a density of at least 1 g/cm³.

12. The method of claim 11, wherein (a) comprises:

(a1) immersing at least a first portion of the piece of natural bamboo within a first solution to remove some of the lignin in the immersed first portion; and (a2) after (a1), immersing at least the first portion within a second solution to remove remaining lignin in the immersed first portion.

13. The method of claim 12, wherein the first solution comprises peroxyformic acid ($CH_2O_3$).

14. The method of claim 13, wherein the second solution comprises sodium hydroxide (NaOH) or potassium hydroxide (KOH).

15. The method of claim 12, wherein the first solution comprises a mixture of potassium hydroxide (KOH) and sodium sulfite ($Na_2SO_3$), a mixture of potassium hydroxide (KOH) and sodium sulfide ($Na_2S$), a mixture of sodium hydroxide (NaOH) and sodium sulfite ($Na_2SO_3$), or a mixture of sodium hydroxide (NaOH) and sodium sulfide ($Na_2S$).

16. The method of claim 15, wherein the second solution comprises a mixture of hydrogen peroxide ($H_2O_2$) and acetic acid ($C_2H_4O_2$), or a mixture of hydrogen peroxide ($H_2O_2$) and formic acid ($CH_2O_2$).

17. The method of claim 11, wherein the structural matrix comprises a polymer or concrete.

18. The method of claim 11, wherein (b) comprises agitating the chemically-treated piece in solution.

19. The method of claim 11, wherein the one or more chemical solutions comprise an alkaline solution.

20. The method of claim 11, wherein a volume of each cellulose-based macrofiber after (c) is at least 10% less than a volume thereof prior to (c).

* * * * *